(12) United States Patent
Solovyev et al.

(10) Patent No.: US 12,143,586 B2
(45) Date of Patent: Nov. 12, 2024

(54) USAGE OF DCT BASED INTERPOLATION FILTER AND ENHANCED BILINEAR INTERPOLATION FILTER IN AFFINE MOTION COMPENSATION

(71) Applicant: Huawei Technologies Co., Ltd., Shenzhen (CN)

(72) Inventors: Timofey Mikhailovich Solovyev, Moscow (RU); Maxim Borisovitch Sychev, Moscow (RU); Huanbang Chen, Shenzhen (CN); Alexander Alexandrovich Karabutov, Moscow (RU); Roman Igorevich Chernyak, Moscow (RU); Sergey Yurievich Ikonin, Moscow (RU); Haitao Yang, Shenzhen (CN); Elena Alexandrovna Alshina, Munich (DE)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 290 days.

(21) Appl. No.: 17/708,861

(22) Filed: Mar. 30, 2022

(65) Prior Publication Data
US 2022/0264094 A1    Aug. 18, 2022

Related U.S. Application Data

(63) Continuation of application No. PCT/RU2020/050259, filed on Sep. 30, 2020.
(Continued)

(30) Foreign Application Priority Data

Sep. 30, 2019   (WO) ................ PCT/RU2019/000690
Sep. 30, 2019   (WO) ................ PCT/RU2019/000691

(51) Int. Cl.
*H04N 19/122*   (2014.01)
*H04N 19/176*   (2014.01)
(Continued)

(52) U.S. Cl.
CPC ......... *H04N 19/122* (2014.11); *H04N 19/176* (2014.11); *H04N 19/523* (2014.11); *H04N 19/547* (2014.11)

(58) Field of Classification Search
CPC ... H04N 19/122; H04N 19/176; H04N 19/523
See application file for complete search history.

(56) References Cited

U.S. PATENT DOCUMENTS

| 2005/0181741 | A1  | 8/2005 | Raj et al. |
| 2006/0093228 | A1* | 5/2006 | Loukianov ........... H04N 19/139 348/E5.064 |

(Continued)

FOREIGN PATENT DOCUMENTS

| CN | 109155855 A | 1/2019 |
| EP | 2107746 A2  | 10/2009 |

(Continued)

OTHER PUBLICATIONS

Li, L., et al., "An Efficient Four-Parameter Affine Motion Model for Video Coding," IEEE Transactions on Circuits and Systems for Video Technology, vol. 28, No. 8, Aug. 2018, 15 pages.
(Continued)

*Primary Examiner* — Zhubing Ren
(74) *Attorney, Agent, or Firm* — Conley Rose, P.C.

(57) ABSTRACT

A method related to adaptive usage of pixel-based and block-based affine motion compensation and includes performing sub-block-based affine transform prediction on an affine block with a first sub-block size if the first sub-block size is greater than or equal to a first sub-block size threshold. If the first sub-block size is less than the first sub-block
(Continued)

size threshold, it is determined whether a pixel-based motion vector field is not applied for performing motion compensation for the affine block. If the motion vector field is not applied, a sub-block-based affine motion prediction is performed with a second sub-block size that is based on the first sub-block size. If the pixel-based motion vector field is applied, motion compensation is performed for a sub-block of the affine block using the pixel-based motion vector field.

22 Claims, 14 Drawing Sheets

Related U.S. Application Data

(60) Provisional application No. 62/912,049, filed on Oct. 7, 2019, provisional application No. 62/908,594, filed on Sep. 30, 2019.

(51) Int. Cl.
  *H04N 19/523* (2014.01)
  *H04N 19/547* (2014.01)

(56) References Cited

U.S. PATENT DOCUMENTS

| | | | |
|---|---|---|---|
| 2017/0332095 A1 | 11/2017 | Zou et al. | |
| 2018/0070102 A1 | 3/2018 | Zhang et al. | |
| 2018/0192047 A1 | 7/2018 | Lv et al. | |
| 2018/0359483 A1 | 12/2018 | Chen et al. | |
| 2019/0045192 A1 | 2/2019 | Socek et al. | |
| 2019/0089960 A1* | 3/2019 | Chen | H04N 19/176 |
| 2019/0230361 A1 | 7/2019 | Zhang et al. | |
| 2019/0313116 A1 | 10/2019 | Lee | |
| 2019/0335170 A1 | 10/2019 | Lee et al. | |
| 2020/0169744 A1* | 5/2020 | Lee | H04N 19/174 |
| 2020/0236385 A1 | 7/2020 | Chono | |
| 2021/0160527 A1* | 5/2021 | Chuang | H04N 19/513 |
| 2021/0243471 A1* | 8/2021 | Liu | H04N 19/196 |

FOREIGN PATENT DOCUMENTS

| | | |
|---|---|---|
| EP | 4026333 A2 | 7/2022 |
| WO | 2016184261 A1 | 11/2016 |
| WO | 2017206804 A1 | 12/2017 |
| WO | 2017222325 A1 | 12/2017 |
| WO | 2018128380 A1 | 7/2018 |
| WO | 2019013217 A1 | 1/2019 |
| WO | 2019027286 A1 | 2/2019 |
| WO | 2019069601 A1 | 4/2019 |
| WO | 2019070944 A1 | 4/2019 |
| WO | 2019117659 A1 | 6/2019 |
| WO | 2020256600 A2 | 12/2020 |

OTHER PUBLICATIONS

ITU-T H.264, Jun. 2019, "Series H: Audiovisual and Multimedia Systems, Infrastructure of audiovisual services—Coding of moving video, Advanced video coding for generic audiovisual services," 836 pages.

ITU-T H.265, Feb. 2018, "Series H: Audiovisual and Multimedia Systems Infrastructure of audiovisual services—Coding of moving video, High efficiency video coding," 692 pages.

Zhou Yun et al, Study on the Development of Video Coding Standard VVC, 2018, 6 pages.

Zhou Jiantong et al., "Trends and technologies of video coding," Aug. 8, 2017, 10 pages.

Xiang Li, et al., "CE2-4.4: Affine block memory bandwidth reduction by MV clip," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0398, 4 pages.

Alshin A et al, "Description of SDR, HDR and 360 video coding technology proposal by Samsung, Huawei, GoPro, and HiSilicon," buJoint Video Exploration Team (JVET) of ITU-T SG 16 WP 3 and ISO/IEC JTC 1/SC 29/WG 11, 10th Meeting: San Diego, US, Apr. 10-20, 2018, JVET-J0024_V2, 119 pages.

Pham Van L et al, "CE4-related: Affine restrictions for the worst-case bandwidth reduction," Joint Video Experts Team (JVET) of ITU-T SG 16 WP 3 and ISO/IEC JTC 1/SC 29/WG 11, 12th Meeting: Macao, CN, Oct. 3-12, 2018, JVET-L0396-v7, 6 pages.

W-J Chien et al, "CE2-related: Worst-case memory bandwidth reduction for VVC," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0400-v3, 7 pages.

Jianle Chen et al, "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2002-v2, 87 pages.

* cited by examiner

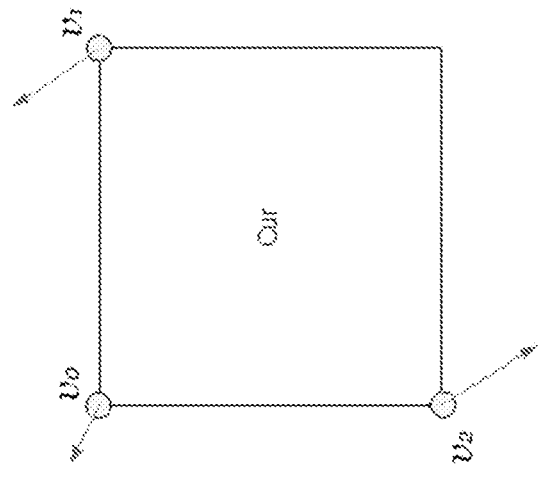
FIG. 6B 6 parameter affine model
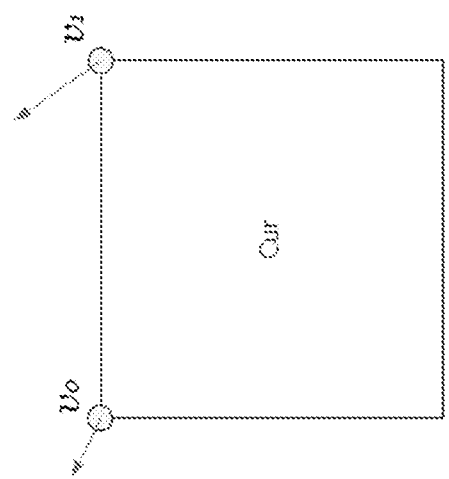
FIG. 6A 4 parameter affine model Affine subblock motion vector field

USAGE OF DCT BASED INTERPOLATION FILTER AND ENHANCED BILINEAR INTERPOLATION FILTER IN AFFINE MOTION COMPENSATION

CROSS-REFERENCE TO RELATED APPLICATION

This is a continuation of International Patent Application No. PCT/RU2020/050259 filed on Sep. 30, 2020, which claims priority to U.S. Provisional Patent Application No. 62/908,594 filed on Sep. 30, 2019, U.S. Provisional Patent Application No. 62/912,049 filed on Oct. 7, 2019, International Patent Application No. PCT/RU2019/000690 filed on Sep. 30, 2019, and International Patent Application No. PCT/RU2019/000691 filed on Sep. 30, 2019. All of the aforementioned patent applications are hereby incorporated by reference in their entireties.

TECHNICAL FIELD

Embodiments of the present disclosure generally relate to the field of picture processing and more particularly to inter prediction, i.e., adaptive usage of discrete cosine transform (DCT) based interpolation filter and enhanced bilinear interpolation filter in affine motion compensation.

BACKGROUND

Video coding (i.e., video encoding and decoding) is used in a wide range of digital video applications, for example broadcast digital television (TV), video transmission over internet and mobile networks, real-time conversational applications such as video chat, video conferencing, DIGITAL VERSATILE DISC (DVD) and BLU-RAY discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY OF THE DISCLOSURE

Embodiments of the present disclosure provide apparatuses and methods for encoding and decoding according to the independent claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

Embodiments of the disclosure provide a method of joint usage sub-block affine motion compensation and pixel-based motion compensation if the limitations on pixel-based motion compensation usage are defined in a video codec. Such limitations are indicated by the hardware requirements such as sequential memory access, the maximum number of lines from the reference picture buffer that can be used during processing of one line of the compensated block, the maximum number of lines that can be loaded additionally from the reference picture buffer in the transition to the next line of the compensated block. The method defines video codec behavior for the cases when, according to the optimal subblock size, pixel-based motion compensation should be used, but it cannot be applied due to hardware architecture limitations. The method is to derive new subblock size based on the optimal subblock size in a manner that do not increased memory bandwidth worst case (that could happen if small sub-block size e.g. 4×4, 4×8, 8×4 is used) and then perform sub-block based motion compensation. The present disclosure defines a balanced scheme of joint usage pixel-based motion compensation and the block-based, from the one side satisfying the hardware requirements and from the other side improving objective and subjective quality of the reconstructed video signal by using pixel-based motion compensation as actively as possible.

A first embodiment of the present disclosure provides a method for coding a video implemented in an encoder or a decoder, the method comprising determining control point motion vectors (CPMVs) for an affine block, determining a first sub-block size of a sub-block of the affine block, if the first sub-block size is greater than or equal to a first sub-block size threshold, performing sub-block-based affine transform prediction on the affine block with the first sub-block size, if the first sub-block size is less than the first sub-block size threshold, determining whether a pixel-based motion vector field is not applied for performing motion compensation for the affine block, according to values of the CPMVs, upon determination that the pixel-based motion vector field is not applied, performing sub-block-based affine transform prediction on the affine block with a second sub-block size, wherein the second sub-block size is based on the first sub-block size, upon determination that the pixel-based motion vector field is applied, performing motion compensation for the affine block using the pixel-based motion vector field.

The method according to the first embodiment allows efficiently performing affine motion compensation by means of an adaptive usage of pixel-based and sub-block-based adaptive usage of affine motion compensation in the same time satisfying hardware architecture requirements. The second aspect is important because pixel-based motion compensation introduces additional difficulties to the chip design especially when non-translational motion models as affine motion model are used. For example, for some values of affine motion model parameters memory access became not sequential from line to line in case of pixel based motion compensation, also for e.g. rotations with the big angles huge number of lines from the reference picture buffer is needed to be fetched to produce only one line of the compensated block.

Particularly for special kinds of motions, such as zoom in/out, rotation, perspective motions and, in general, irregular motions, the computational effort required for appropriate predictions may become high. For example, pixel-based affine motion compensation may involve elaborate computational efforts. On the other hand, block-based affine may cause performance loss and visual artifacts. The method according to the first embodiment optimizes performances and computational efforts by the adaptive usage of both sub-block-based affine transform prediction and motion compensation using pixel-based motion vector field.

The method according to the first embodiment comprises determining a first sub-block size of a sub-block of the affine block. If the first sub-block size is greater than or equal to a first sub-block size threshold, then, according to the first embodiment, sub-block-based affine transform prediction on the affine block is performed with the first sub-block size. For example, the first sub-block size threshold may be 4×8, 8×4 or 8×8. According to a further example, the first sub-block size threshold may be 4×4. According to a further example, if both sub-block width M and sub-block height N are greater or equal than a first threshold, such as 8, then sub-block affine motion compensation is performed with M×N sub-block.

According to an aspect of the first embodiment, determining whether a pixel-based motion vector field is not applied for performing motion compensation for the affine block, according to values of the CPMVs, comprises determining a variable "eifCanBeApplied", according to values of the CPMVs, if the value of variable "eifcanbeapplied" is true, perform motion compensation for a sub-block of the affine block using a pixel-based motion vector field, if the value of variable "eifcanbeapplied" is false, performing sub-block-based affine transform prediction on the affine block with the second sub-block size.

According to a further aspect of the first embodiment, the second sub-block size is set as a second sub-block size threshold, when the first sub-block size is smaller than the second sub-block size threshold. This threshold is defined based on hardware architecture requirements, in particular codec worst-case memory bandwidth can be taken into account. For example, just using block-based affine motion compensation with the optimal (from coding efficiency point of view) subblock size in case of pixel-based motion compensation cannot be applied due to hardware limitations will cause worst-case memory bandwidth increase for the whole codec. Comparing memory bandwidth for 4×4 and 8×8 sub-blocks, memory bandwidth worst-case can became two times more (worse). Such big memory bandwidth increase made the hardware implementation of the codec much less efficient significantly increasing power consumption of the chip. From the other side introducing some reasonable threshold on the minimal subblock size for cases when pixel-based motion compensation cannot be applied due to hardware limitations allows to stay in the same memory bandwidth worst-case, in the same time do not losing the coding efficiency too much.

According to a further aspect of the first embodiment, the second sub-block size threshold is a square sub-block size threshold N×N.

According to a further aspect of the first embodiment, the second sub-block size threshold is 8×8. The 8×8 bi-predicted blocks corresponds to the H.265/High Efficiency Video Coding (HEVC) memory bandwidth worst case. It is supposed that modern hardware architectures support this video codec so, such memory bandwidth worst-case can be considered like a manageable.

According to a further aspect of the first embodiment, the following are calculated sizeSbX'=Max(8,sizeSbX), and sizeSbY'=Max(8,sizeSbY), wherein the second sub-block size threshold is 8, sizeSbX and sizeSbY indicate the first sub-block size, sizeSbX' and sizeSbY' indicate the second sub-block size.

According to a further aspect of the first embodiment, the second sub-block size threshold is the same as the first sub-block size threshold. Having the same first and second sub-block size threshold made sub-block size derivation easier to implement. Such limitation of the first aspect works for video codecs those have memory bandwidth worst-case corresponding to the first sub-block size threshold. In general, the first threshold is defined mostly from coding efficiency point of view, whereas the second threshold is defined based on hardware requirements, in particular based on memory bandwidth requirements.

According to a further aspect of the first embodiment, performing motion compensation for a sub-block of the affine block using a pixel-based motion vector field, comprises deriving the pixel-based motion vector field for the affine block, obtaining interpolated samples in a reference picture based on the derived motion vector field, and applying a high-pass filter to the interpolated samples.

For example, interpolated samples may be obtained using bilinear interpolation. According to a further example, interpolated samples may be obtained using a separable interpolation filter with N taps. Using pixel-based motion compensation cause additional computational efforts due to less number of operation results can be reused during the interpolation process. That's the reason why pixel-based motion compensation is rarely used with e.g. 8-tap DCT-based filters that are in contrast widely used for block based motion compensation. Using pixel-based motion compensation with bilinear interpolation allows to preserve and in some cases even reduce complexity in comparison with block-based motion compensation with 8-tap DCT-based interpolation filters, but shorter filter creates visible blurring artifacts that made such pixel-based motion compensation unpractical. At the same time adding simple 3-tap high-pass filter with the fixed coefficients after the bilinear interpolation allows to achieve noticeable subjective improvement of the reconstructed signal with manageable complexity.

According to a further aspect of the first embodiment, the method is implemented in an encoder, and the first sub-block size is determined based on differences between the CPMVs as well as a width and a height of the affine block.

According to a further aspect of the first embodiment, the first sub-block size is determined based on differences between the CPMVs as well as a width and a height of the affine block, and precision of the CPMVs.

According to a further aspect of the first embodiment, the first sub-block size is determined from a lookup table based on the affine motion model parameters.

According to a further aspect of the first embodiment, determining whether to perform motion compensation for the affine block using a pixel-based motion vector field comprises determining a reference area in the reference picture corresponding to the affine block, and comparing a size of the reference area to a first predefined threshold.

For example, the ratio of the area of a reference block in the reference picture to the area of the current block may be considered.

According to a further aspect of the first embodiment, the method further comprises determining an expanded sub-block by adding pixel margins to from each border of the sub-block based on a length of the high-pass filter, deriving motion vectors for each corner of the expanded sub-block based on the CPMVs, deriving a transformed block in the reference picture based on the derived motion vectors, and deriving a bounding box for the transformed block, wherein the reference area corresponds to the bounding box expanded by one pixel from each border of the bounding box.

According to a further aspect of the first embodiment, the determining whether to perform motion compensation for the affine block using a pixel-based motion vector field comprises determining a number of lines in the reference picture required for processing a line of a sub-block of the affine block, and comparing the number of lines to a second predefined threshold. For example, the lines may be the rows of the picture.

According to a further aspect of the first embodiment, the size of the sub-block is predefined.

According to a further aspect of the first embodiment, the size of the sub-block is 4×4.

According to a further aspect of the first embodiment, the second predefined threshold is set according to a size of an internal buffer of the encoder or the decoder, respectively.

According to a further aspect of the first embodiment, the second predefined threshold is set to 3, 4, or 5.

According to a further aspect of the first embodiment, the determining whether to perform motion compensation for a sub-block using a pixel-based motion vector field comprises determining whether lines of the reference picture are accessed sequentially when sequentially processing lines of the sub-block.

According to a further aspect of the first embodiment, a violation of a sequential access of the lines of the reference picture is determined based on a change of a y-component of a motion vector per line of the sub-block being less than minus one integer pixel.

According to a further aspect of the first embodiment, the determining whether to perform motion compensation for a sub-block using a pixel-based motion vector field comprises deriving affine motion model parameters from the values of the CPMVs, and determining whether the affine motion model parameters lie inside predefined ranges of values.

According to a further aspect of the first embodiment, the method is implemented in a decoder, wherein the sub-block size is parsed from a bitstream of the video.

According to a further aspect of the first embodiment, the method comprises determining CPMVs for an affine block according to affine inter-prediction, determining, whether to perform motion compensation for the affine block using a pixel-based motion vector field, according to values of the CPMVs, upon determination that motion compensation is to be performed for the affine block using a pixel-based motion vector field, deriving the pixel-based motion vector field for a sub-block of the affine block, obtaining interpolated samples in a reference picture based on the derived motion vector field, and applying a high-pass filter to the interpolated samples, and otherwise, performing sub-block-based affine transform prediction on the affine block with predefined sub-block size M×N.

The predefined sub-block size M×N could be for example 4×4, 4×8, 8×4 or 8×8.

According to a second embodiment, an encoder is provided, comprising processing circuitry for carrying out the method according to any one of the aspects of the first embodiment.

According to a third embodiment, a decoder is provided, comprising processing circuitry for carrying out the method according to any one of the aspects of the first embodiment.

According to a fourth embodiment, a computer program product is provided, comprising instructions which, when the program is executed by a computer, cause the computer to carry out the method according to any one of the aspects of the first embodiment.

According to a fifth embodiment, a decoder is provided, comprising one or more processors, and a non-transitory computer-readable storage medium coupled to the one or more processors and storing instructions for execution by the one or more processors, wherein the instructions, when executed by the one or more processors, configure the decoder to carry out the method according to any one of the aspects of the first embodiment.

According to a sixth embodiment, an encoder is provided, comprising one or more processors, and a non-transitory computer-readable storage medium coupled to the one or more processors and storing instructions for execution by the one or more processors, wherein the instructions, when executed by the one or more processors, configure the encoder to carry out the method according to any one of the aspects of the first embodiment.

According to a seventh embodiment, a non-transitory computer-readable medium is provided, carrying a program code which, when executed by a computer device, causes the computer device to perform the method of any one of the aspects of the first embodiment.

According to an eighth embodiment, a decoder or an encoder for coding a video sequence is provided, comprising a determining unit configured to determine CPMVs for an affine block and a first sub-block size of a sub-block of the affine block, a predicting and determining unit configured to perform sub-block-based affine transform prediction on the affine block with the first sub-block size if the first sub-block size is greater than or equal to a first sub-block size threshold, and if the first sub-block size is less than the first sub-block size threshold, determine whether a pixel-based motion vector field is not applied for performing motion compensation for the affine block, according to values of the CPMVs, and upon determination that the pixel-based motion vector field is not applied, perform sub-block-based affine transform prediction on the affine block with a second sub-block size, wherein the second sub-block size is based on the first sub-block size, and upon determination that the pixel-based motion vector field is applied, perform motion compensation for a sub-block of the affine block using the pixel-based motion vector field According to a ninth embodiment, a decoder or an encoder for coding a video sequence is provided, comprising a first determining unit configured to determine CPMVs for an affine block according to affine inter-prediction, a second determining unit configured to determine, whether to perform motion compensation for the affine block using a pixel-based motion vector field, according to values of the CPMVs, and a predicting unit configured to upon determination that motion compensation is to be performed for the affine block using a pixel-based motion vector field, derive the pixel-based motion vector field for a sub-block of the affine block, obtain interpolated samples in a reference picture based on the derived motion vector field, and apply a high-pass filter to the interpolated samples, and otherwise, perform sub-block-based affine transform prediction on the affine block with predefined sub-block size M×N.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings which include the following.

FIG. 6A is an illustration example of control point based affine motion model: 4-parameters.

FIG. 6B is an illustration example of control point based affine motion model: 6-parameters.

Figure 1A:
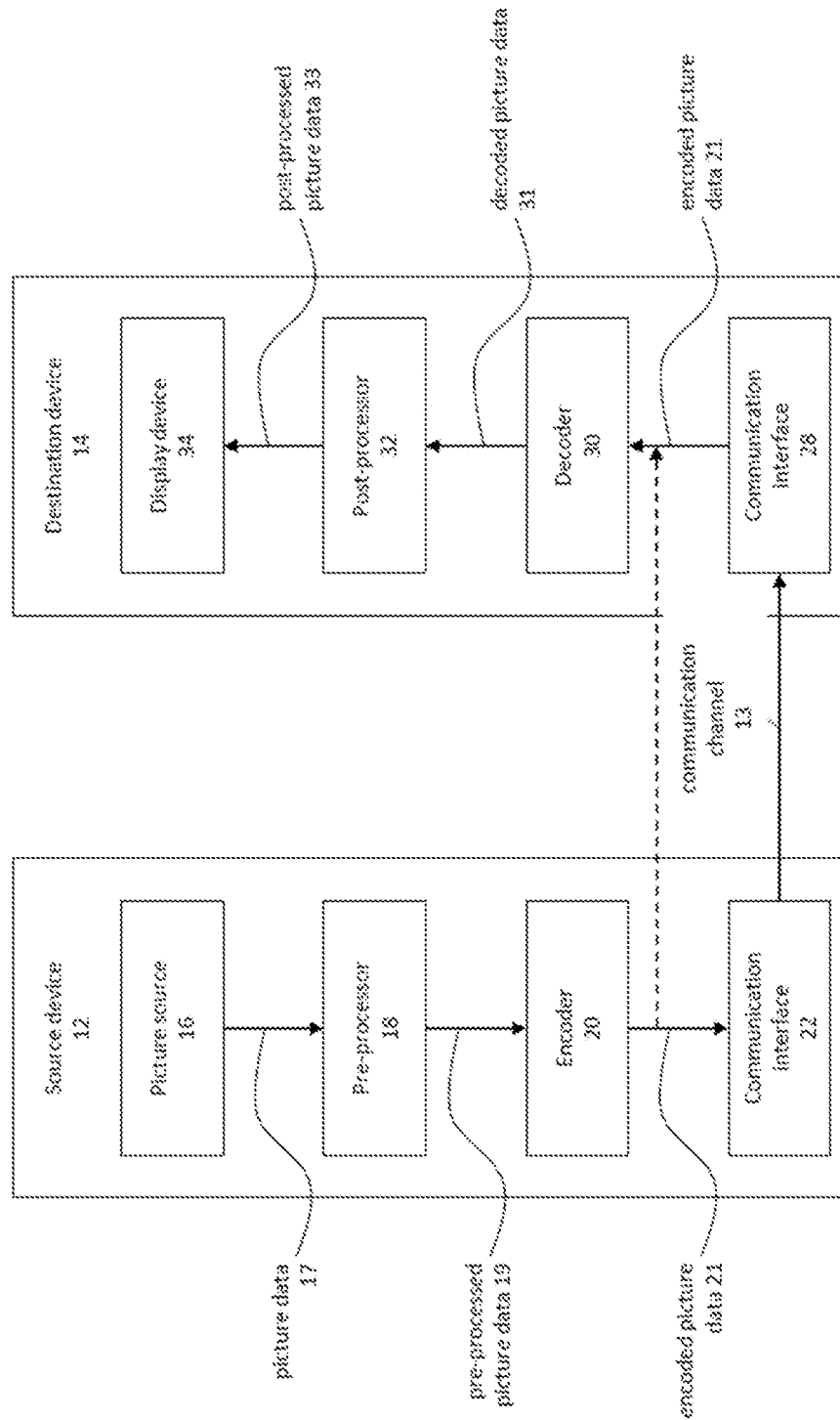
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (coding and decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present disclosure. Video encoder 20 (or short encoder 20) and video decoder 30 (or short decoder 30) of video coding system 10 represent examples of devices that may be configured to perform techniques in accordance with various examples described in the present disclosure.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, and blue (RGB) to luma, blue-difference chroma, and red-difference chroma (YCbCr)), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid-crystal displays (LCD), organic light-emitting diodes (OLEDs) displays, plasma displays, projectors, micro LED displays, liquid-crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
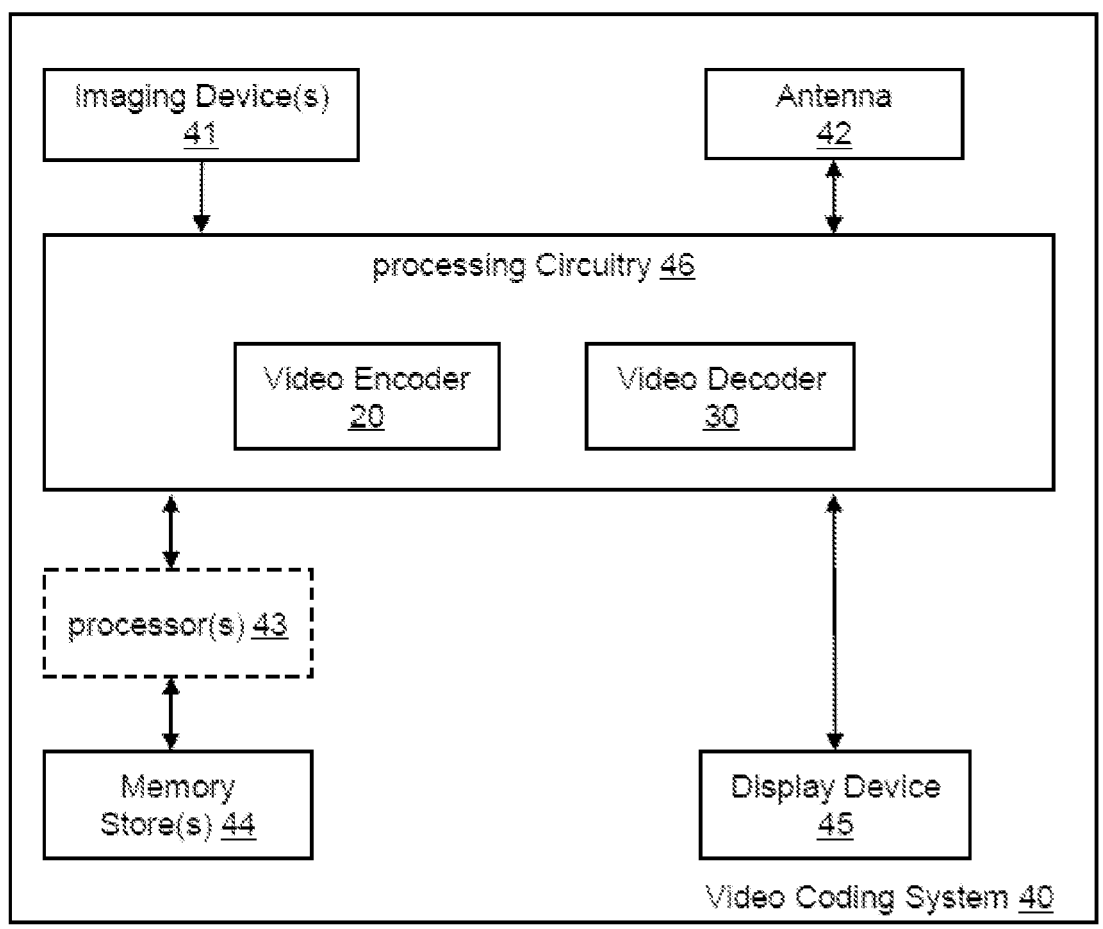
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to HEVC or to the reference software of Versatile Video coding (VVC), the next generation video coding standard developed by the Joint Collaboration Team on Video Coding (JCT-VC) of International Telecommunication Union (ITU) Telecommunication Standardization Sector (ITU-T) Video Coding Experts Group (VCEG) and International Organization for Standardization (ISO)/International Electrotechnical Commission (IEC) Motion Picture Experts Group (MPEG). One of ordinary skill in the art will understand that embodiments of the disclosure are not limited to HEVC or VVC.

Figure 2:
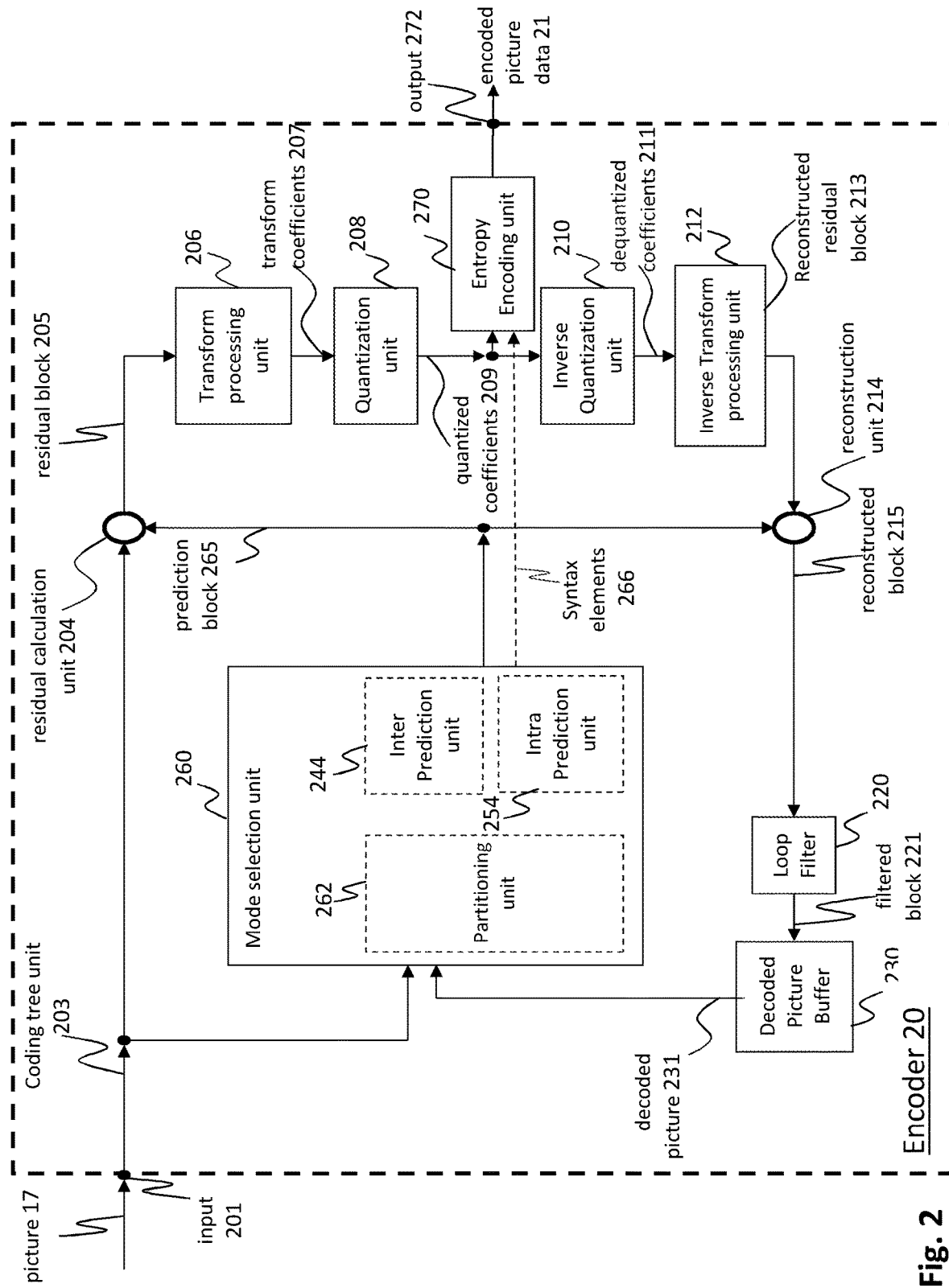
FIG. 2 is a block diagram showing an example of a video encoder configured to implement embodiments of the disclosure.

Encoder and Encoding Method:

FIG. 2 shows a schematic block diagram of an example video encoder 20 that is configured to implement the techniques of the present disclosure. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
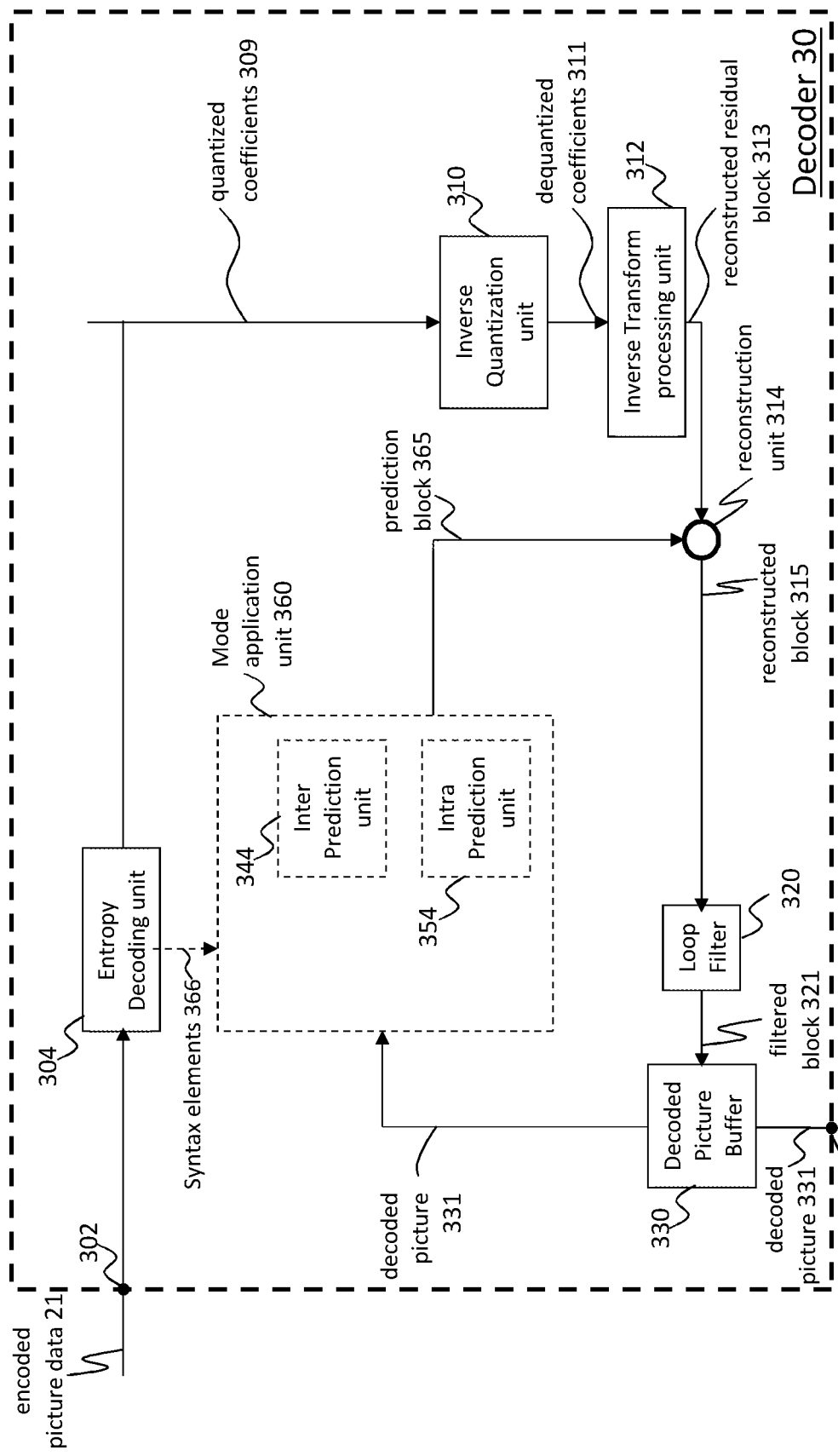
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks):

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma) component Y represents the brightness or grey level intensity (e.g. like in a grey-scale picture), while the two chrominance (or chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/Advanced Video Coding (AVC)) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (or video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation:

The residual calculation unit 204 may be configured to calculate a residual block 205 (or residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform:

The transform processing unit 206 may be configured to apply a transform, e.g. a DCT or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization:

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output QPs, e.g. directly or encoded via the entropy encoding unit 270, so that, e.g., the video decoder 30 may receive and apply the quantization parameters for decoding.

Inverse Quantization:

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform:

The inverse transform processing unit 212 is configured to apply the inverse transform of the transform applied by the transform processing unit 206, e.g. an inverse DCT or inverse DST or other inverse transforms, to obtain a reconstructed residual block 213 (or corresponding dequantized coefficients 213) in the sample domain. The reconstructed residual block 213 may also be referred to as transform block 213.

Reconstruction:

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering:

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, advanced temporal motion vector prediction (TMVP) (ATMVP) sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

DPB:

The DPB 230 may be a memory that stores reference pictures, or in general reference picture data, for encoding video data by video encoder 20. The DPB 230 may be formed by any of a variety of memory devices, such as dynamic random-access memory (RAM) (DRAM), including synchronous DRAM (SDRAM), magnetoresistive RAM (MRAM), resistive RAM (RRAM), or other types of memory devices. The DPB 230 may be configured to store one or more filtered blocks 221. The DPB 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from DPB 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning:

The partitioning unit 262 may be configured to partition a picture from a video sequence into a sequence of CTUs, and the partitioning unit 262 may partition (or split) a CTU 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing VVC, but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (or sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a CTU may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a CTB may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a CTU may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as VVC, a combined quad-tree nested multi-type tree using binary and ternary splits segmentation structure for example used to partition a coding tree unit. In the coding tree structure within a coding tree unit, a CU can have either a square or rectangular shape. For example, the CTU is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU. VVC develops a unique signaling mechanism of the partition splitting information in quadtree with nested multi-type tree coding tree structure. In the signaling mechanism, a CTU is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned, when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs sizes.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction:

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction:

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, extended merge prediction, the merge candidate list of such mode is constructed by including the following five types of candidates in order: spatial MVP from spatial neighbor CUs, temporal MVP from collocated CUs, history-based MVP from a first in first out (FIFO) table, pairwise average MVP and zero MVs. And a bilateral-matching based decoder side motion vector refinement (DMVR) may be applied to increase the accuracy of the MVs of the merge mode. Merge mode with Multiview Video plus Depth (MVD) (MMVD), which comes from merge mode with motion vector differences. An MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three CPMVs (6-parameter). Subblock-based TMVP (SbTMVP), which is similar to the TMVP in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, a context adaptive VLC scheme (CAVLC), an arithmetic coding scheme, a binarization, a context adaptive binary arithmetic coding (CABAC), syntax-based CABAC (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method:

FIG. 3 shows an example of a video decoder 30 that is configured to implement the techniques of this present disclosure. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a DBP 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the DPB 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the DPB 330 may be identical in function to the DPB 230. Therefore, the explanations provided for the respective units and functions of the video 20 encoder apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization:

The inverse quantization unit 310 may be configured to receive QPs (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform:

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction:

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering:

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a SAO filter or one or more other filters, e.g. an ALF, an NSF, or any combination thereof. In an example, the loop filter unit 220 may comprise a de-blocking filter, a SAO filter and an ALF filter. The order of the filtering process may be the deblocking filter, SAO and ALF. In another example, a process called the LMCS (namely, the adaptive in-loop reshaper) is added. This process is performed before deblocking. In another example, the deblocking filter process may be also applied to internal sub-block edges, e.g. affine sub-blocks edges, ATMVP sub-blocks edges, SBT edges and ISP edges. Although the loop filter unit 320 is shown in FIG. 3 as being an in loop filter, in other configurations, the loop filter unit 320 may be implemented as a post loop filter.

DPB:

The decoded video blocks 321 of a picture are then stored in DPB 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction:

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or generalized P and B (GPB) slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as clip or shift, may be performed on the processing result of the interpolation filtering, motion vector derivation or loop filtering.

It should be noted that further operations may be applied to the derived motion vectors of current block (including but not limit to CPMVs of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is −32768~32767, if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
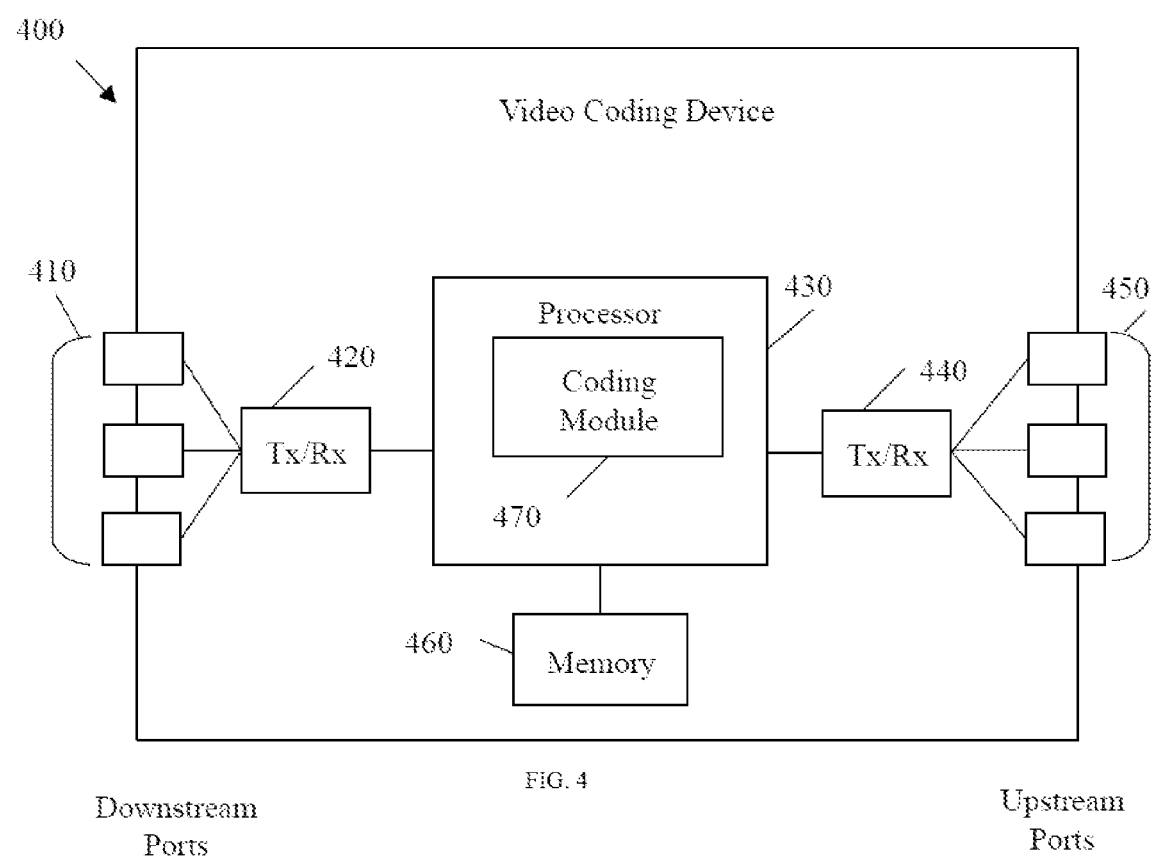
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data, a processor, logic unit, or central processing unit (CPU) 430 to process the data, transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random-access memory (RAM), ternary content-addressable memory (TCAM), and/or static RAM (SRAM).

Figure 5:
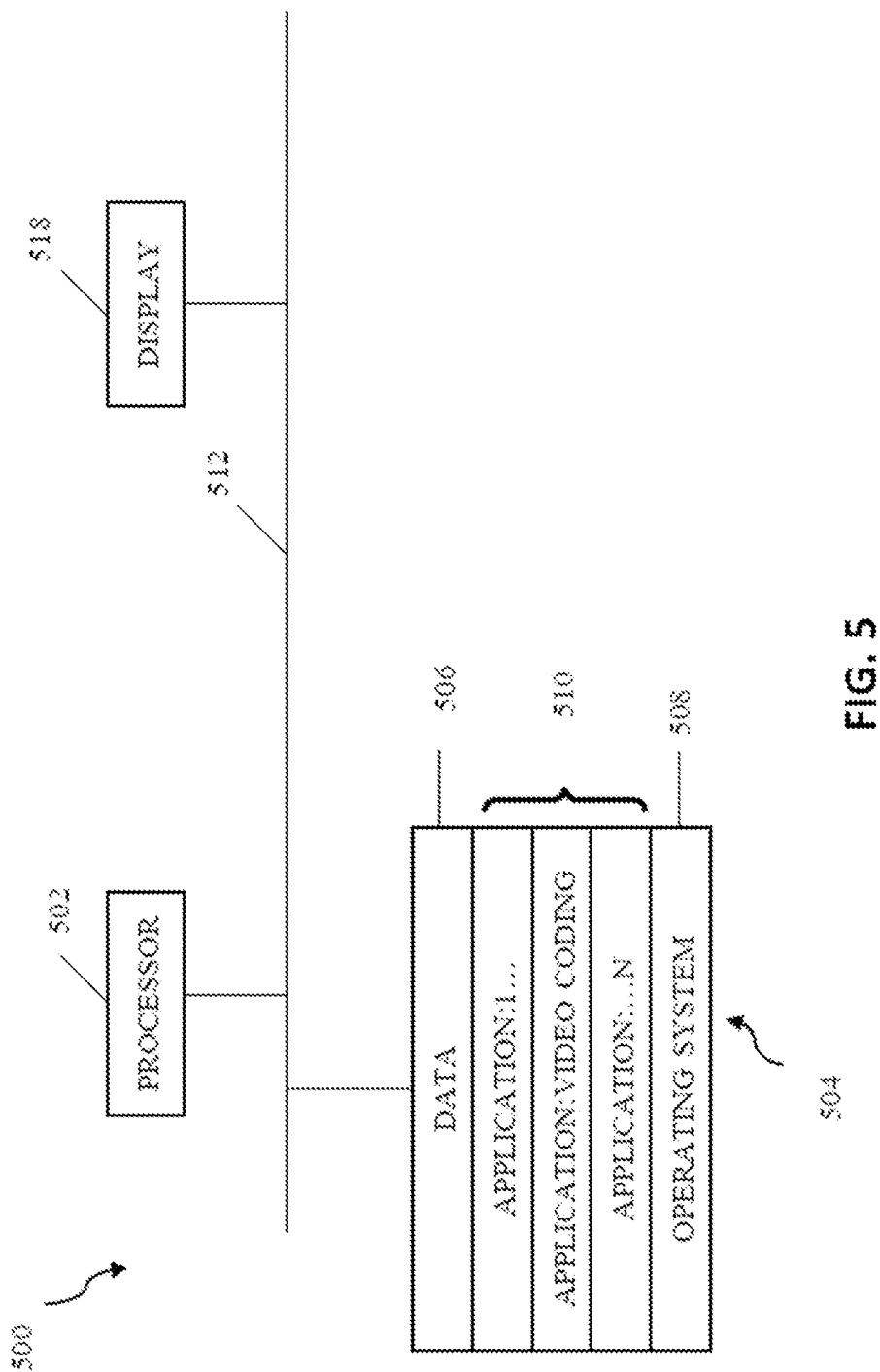
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Affine Motion Compensated Prediction:

In ITU-T H.265, only a translation motion model is applied for motion compensation prediction (MCP). In the real world, however, there are many kinds of motion, e.g. zoom in/out, rotation, perspective motions and other irregular motions. In the VTM6, a block-based affine transform motion compensation prediction is applied. As shown in FIG. 6, the affine motion field of a block is described by motion information of two control point (4-parameter) or three CPMV (6-parameter).

The general equation for calculation of a motion vector at sample location (x, y) is:

$$\begin{cases} mv_x = dHorX * x + dVerX * y + mv_{0x} \\ mv_y = dHorY * x + dVerY * y + mv_{0y} \end{cases} \quad (1\text{-}1)$$

For the 4-parameter affine motion model, the motion vector at sample location (x, y) is derived as:

$$\begin{cases} mv_x = \dfrac{mv_{1x} - mv_{0x}}{w} x + \dfrac{mv_{0y} - mv_{1y}}{w} y + mv_{0x} \\ mv_y = \dfrac{mv_{1y} - mv_{0y}}{w} x + \dfrac{mv_{1x} - mv_{0x}}{w} y + mv_{0y} \end{cases} \quad (1\text{-}2)$$

For the 6-parameter affine motion model, the motion vector at sample location (x, y) is derived as:

$$\begin{cases} mv_x = \dfrac{mv_{1x} - mv_{0x}}{w} x + \dfrac{mv_{2x} - mv_{0x}}{h} y + mv_{0x} \\ mv_y = \dfrac{mv_{1y} - mv_{0y}}{w} x + \dfrac{mv_{2y} - mv_{0y}}{h} y + mv_{0y} \end{cases} \quad (1\text{-}3)$$

where ($mv_{0x}$, $mv_{0y}$) is the motion vector of the top-left corner control point, ($mv_{1x}$, $mv_{1y}$) is the motion vector of the top-right corner control point, and ($mv_{2x}$, $mv_{2y}$) is the motion vector of the bottom-left corner control point. w is the width of the block and h is the height of the block.

For the case of using the 6-parameter affine motion model:

$$dHorX = \frac{mv_{1x} - mv_{0x}}{w} \quad (1-4)$$

$$dHorY = \frac{mv_{1y} - mv_{0y}}{w}, \quad (1-5)$$

$$dVerX = \frac{mv_{2x} - mv_{0x}}{h}, \quad (1-6)$$

$$dVerY = \frac{mv_{2y} - mv_{0y}}{h}. \quad (1-7)$$

For the case of using the 4-parameter affine motion model:

$$dHorX = \frac{mv_{1x} - mv_{0x}}{w}, \quad (1-8)$$

$$dHorY = \frac{mv_{1y} - mv_{0y}}{w}, \quad (1-9)$$

$$dVerX = -dHorY, \quad (1-10)$$

$$dVerY = dHorX. \quad (1-11)$$

As for the translational motion inter prediction, there are also two affine motion inter prediction modes: affine merge mode and affine AMVP mode.

Block-based affine transform prediction.

Figure 7:
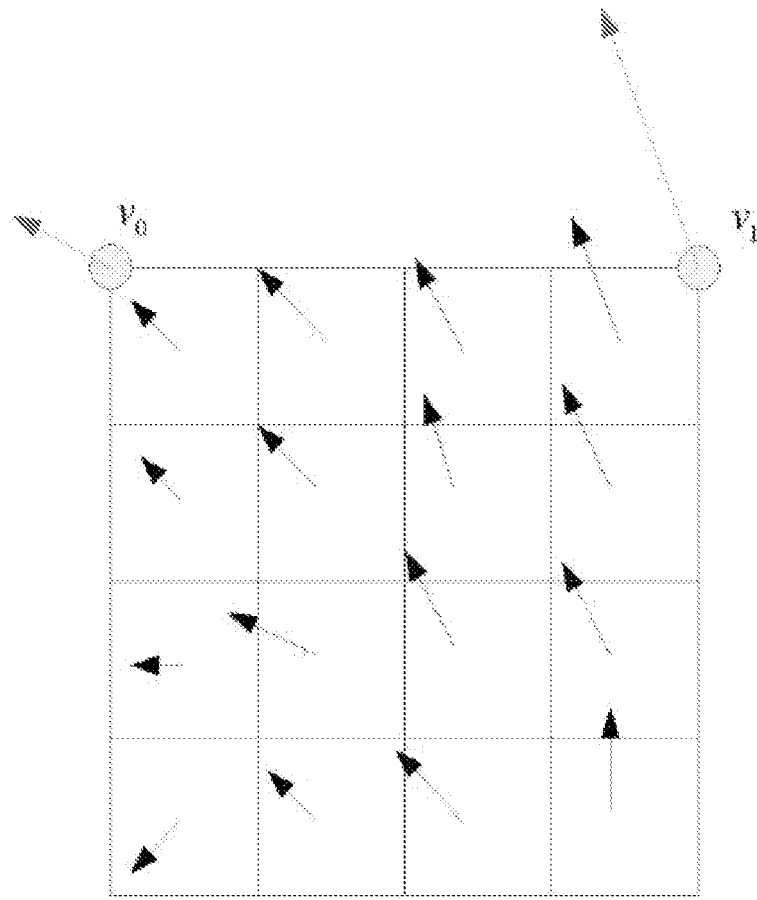
FIG. 7 is an illustration example of an affine subblock motion vector field.

In order to simplify the motion compensation prediction, block-based affine transform prediction is applied. To derive a motion vector of each 8×8 luma sub-block, the motion vector of the center sample of each sub-block, as shown in FIG. 7, is calculated according to the above equations, and rounded to 1/16 fraction accuracy. Then, the motion compensation interpolation filters are applied, to generate the prediction of each sub-block with the derived motion vector. The sub-block size of chroma-components is set to 4×4.

EIF:

EIF can be used for a prediction block and on a sub-block basis. The filtering procedure is the same for luma and for chroma signals. The filtering procedure comprises the following steps:

Deriving a pixel-based motion vector field from the CPMVs according to equation (1-1);
Obtaining interpolated samples based on the derived motion vectors, using bilinear interpolation for the fractional offsets;
Performing horizontal and then vertical filtering using a fixed 3-tap high-pass filter [−1, 10, −1] with normalization factor of 8.

Figure 8:
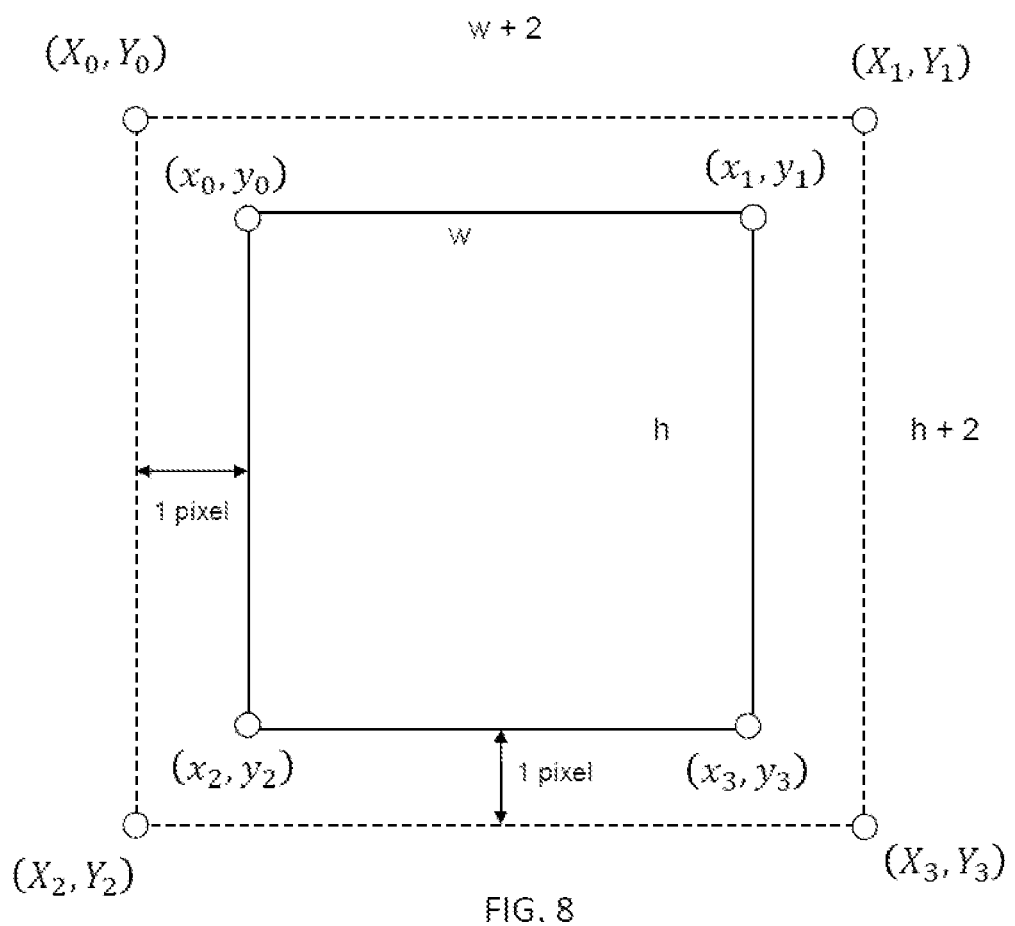
FIG. 8 is an illustration example of the coordinates of corners of affine block (subblock) and of intermediate enhanced bi-linear interpolation filter (EIF) block (subblock).

The first two steps are performed for a (w+2)×(h+2) area, where w and h are the prediction block width and height correspondently. One pixel margin from each border is added for applying the 3-tap filter at the third step. The original affine block and the corresponding (w+2)×(h+2) block that is used in the intermediate step of EIF are depicted in FIG. 8.

Memory Bandwidth Calculation:

The memory bandwidth is calculated as a reference block to current block area ratio. For example, for an 8×8 bi-predictive block in case of using an interpolation filter with T taps, the reference area value Sr is equal to 2(8+T−1)(8+T−1), and the block area Sb is equal to 8*8. Thus, the memory bandwidth is $$MB_{8 \times 8} = \frac{2(8 + T - 1)(8 + T - 1)}{64}.$$

For the 8-tap DCT Interpolation Filter (DCTIF) that is used in ITU-T H.265, VVC and Essential Video Coding (EVC), $$MB_{8 \times 8} = \frac{2 * 15 * 15}{64} = 7.03125.$$

Adaptive usage of EIF and block-based affine motion compensation. Problem definition.

Sub-block affine motion compensation with minimal sub-block size 8×8 is much more hardware friendly than affine motion compensation with minimal sub-block size 4×4. There are at least three reasons for that.

Memory bandwidth. Affine motion compensation with minimal sub-block size 8×8 does not increase the memory bandwidth compared to ITU-T H.265, because 8×8 bi-predictive blocks are the worst case for ITU-T H.265 in terms of memory bandwidth calculation. In EVC, 8×8 bi-predictive blocks also do not change the worst case in terms of memory bandwidth (8×4/4×8 bi-predictive blocks are the worst case in EVC 3.0 and 4×16/16×4 blocks are going to be the worst case in EVC 4.0). Basically, 8×8 bi-predictive blocks can occur in regular inter prediction both in EVC and ITU-T H.265, so affine sub-block motion compensation with such minimal block size does not increase the complexity of motion compensation.

Number of multiplications. Motion compensation for 8×8 sub-blocks requires a much smaller number of multiplications than motion compensation of four 4×4 sub-blocks.

Memory access. In some hardware implementations, no less than 16 samples can be read. From this perspective, 8×8 blocks that in the case of using 8-tap DCTIF takes (8+8−1)*(8+8−1) reference samples, utilize memory much more efficiently than 4×4 blocks.

However, sub-block affine motion compensation with minimal sub-block size 8×8 has a significant performance drop in comparison with sub-block affine motion compensation with minimal sub-block size 4×4, especially for content with fast rotation. For such content, EIF can be used. EIF has fewer multiplications in comparison with sub-block affine motion compensation with minimal sub-block sizes 8×8 and 4×4. However, memory bandwidth for EIF without affine motion model restrictions can be huge. Also, for effective hardware implementations of EIF, some additional requirements can appear. For example, the following requirements can appear for EIF from the hardware perspective.

The internal buffer is limited to N lines, where N can be for example 3, 4, 5 or more. This means that during processing of one line (one row) of the current block (sub-block), no more than N lines from the reference picture can be used.

Memory access should be sequential, which means that if for the $i_{th}$ line of current block the $j_{th}$ line of the reference picture is fetched, then for the $(i+1)_{th}$ line of the current block only lines j+1, j+2, . . . can be fetched.

No more than one additional line can be fetched for all lines of the current block except for the first.

The current disclosure provides an adaptive scheme of using EIF and sub-block affine motion compensation.

Adaptive usage of EIF and block-based affine motion compensation. Basic algorithm.

The basic algorithm of adaptive usage of EIF and sub-block affine motion compensation is as follows.

Calculate optimal sub-block size M×N based on affine motion model parameters, such as dHorX, dHorY, dVerX, dVerY.

If both optimal sub-block width M and optimal sub-block height N are greater or equal than 8, then perform sub-block affine motion compensation with M×N sub-block. Otherwise, check EIF applicability conditions:
EIF applicability condition 1
EIF applicability condition 2
. . . .

If all EIF applicability conditions are met, then perform EIF motion compensation Otherwise set M=max(M, 8), N=max(N, 8) and perform sub-block motion compensation with M×N sub-block.

The details of some steps of this basic algorithm are described below.

Step 1. Optimal Sub-Block Size Calculation

One method for deriving affine sub-block size is based on the motion vector differences of the affine control points and the width and height of an affine block. The sub-block size M×N may be derived as by Equation (2-1), where MvPre is the motion vector accuracy (e.g., ¼ pel in HEVC standard or 1/16 pel in VVC and EVC standards), and affine motion model parameters dHorX, dHorY, dVerX, dVerY are calculated according to equations (1-4)-(1-7) for the 6-parameter model and according to equations (1-8)-(1-11) for the 4-parameter model.

$$\begin{cases} M = \text{clip } 3 \left(4, w, \dfrac{w \times MvPre}{\max(\text{abs}(dHorX), \text{abs}(dHorY))}\right) \\ N = \text{clip } 3 \left(4, h, \dfrac{h \times mvPre}{\max, (\text{abs}(dVerX), \text{abs}(dVerY))}\right) \end{cases} \quad (2\text{-}1)$$

M and N derived in Equation (2-1) will be adjusted downward if necessary to make sure that w and h is divisible by M and N, respectively.

Another method is to build a 3-dimensional look-up table, then get the sub-block size directly from the look-up table according to motion vector difference, affine block size, and motion vector precision as the 3 indices. For example, set M to Table_M[x][y][z], where x is equal to max (abs($v_{1x}-v_{0x}$), abs($v_{1y}-v_{0y}$)), y is equal to the affine block width, z is equal to the motion vector precision, set N to Table_N[x][y][z], where x is equal to max (abs($v_{2x}-v_{0x}$), abs($v_{2y}-v_{0y}$)), y is equal to affine block height, z is equal to the motion vector precision.

Step 3. EIF Applicability Conditions:

EIF applicability conditions can be for example as follows.

Figure 9:
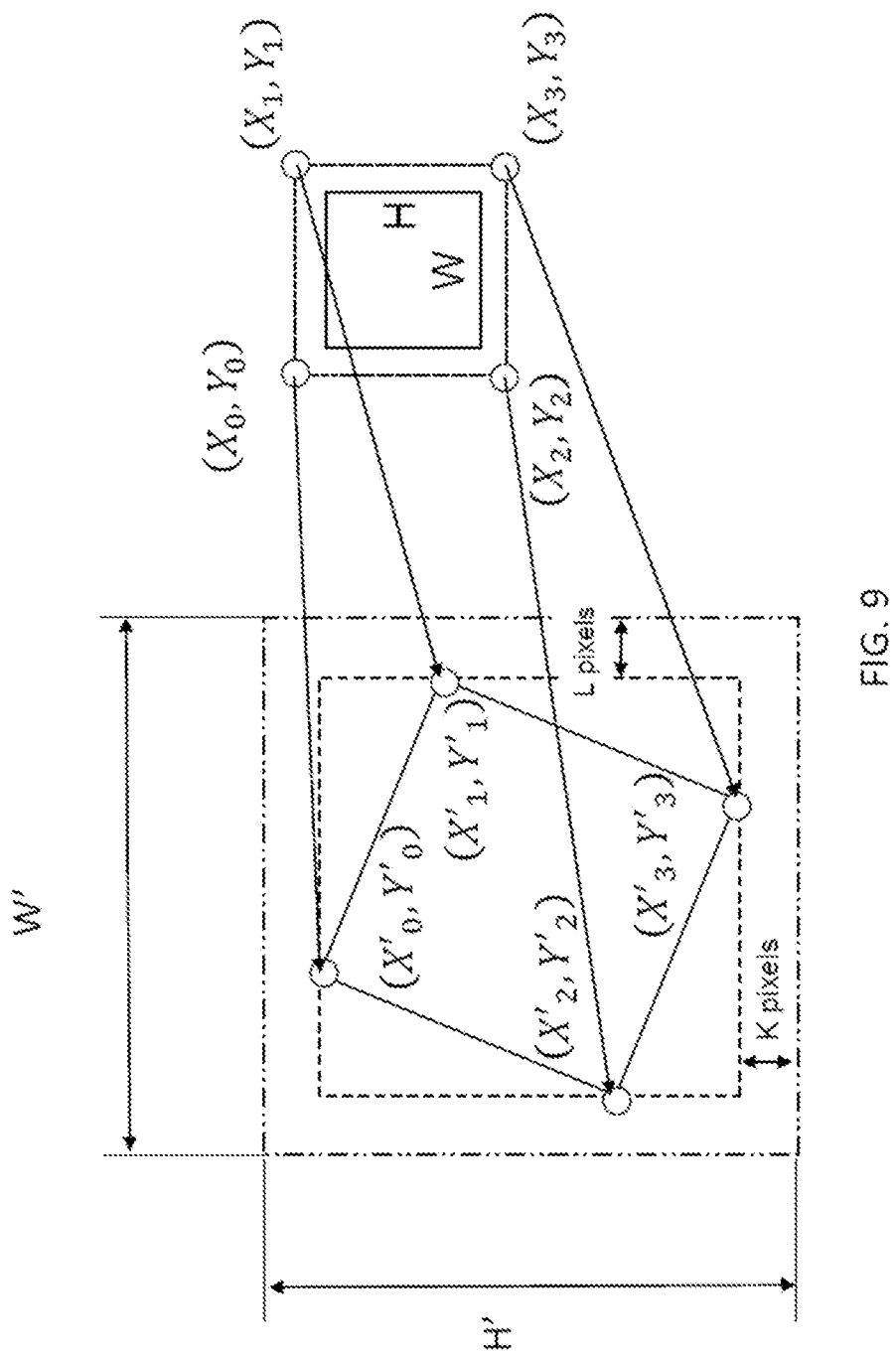
FIG. 9 is an illustration example of the location of a transformed block (subblock) in the reference picture and corresponding bounding box.

Memory bandwidth restrictions. This kind of restrictions guarantee that the size of the area in the reference picture corresponding to the current affine block (EIF block) is no more than a predefined threshold T. An example of the definition of the area in the reference picture corresponding to the current affine block is depicted in FIG. 9.

The internal buffer is limited to R lines, where R is a predefined value and can be for example 3, 4, 5 or more. This means that during processing of one line (one row) of the current block (sub-block), no more than R lines from the reference picture can be used.

Memory access should be sequential, which means that if for the $i_{th}$ line of the current block, the $j_{th}$ line of the reference picture is fetched, then for the $(i+1)_{th}$ line of the current block, only lines j+1, j+2, . . . can be fetched.

No more than one additional line can be fetched for all lines of the current block except for the first.

Specific ranges for affine motion model parameters, for example as following $$\begin{cases} a \le dHorX \le b \\ c \le dHorY \le d \\ e \le dVerX \le f \\ g \le dVerY \le h \end{cases},$$

where a, b, c, d, e, f, g, h are predefined values or plus/minus infinity.

$$\begin{cases} dHorX \le a * dVerX \\ dVerY \le b * dHorY \end{cases},$$

where a and b are predefined values

The following examples apply the methods according to the current disclosure to MPEG-5/EVC.

Example 1

In this example, EIF comprising bilinear interpolation and high-pass filtering, is used for pixel based motion compensation, predefined sub-block size, used to decide applicability of pixel based motion compensation, is equal to 4×4, maximum number of fetched lines during processing the first line R is equal to 3, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.

The first and the second sub-block size threshold are the same and corresponds to the square block with size N×N, where N is equal to 8.

The variable eifSubblockSize is set equal to 4.

The variable eifCanBeApplied is derived as follows:

eifCanBeApplied is set to TRUE
The arrays X[i], Y[i] are derived as follows:
X[0] = 0
X[1] = ( eifSubblockSize + 1 ) * ( dX[0] + ( 1 << 9 ) )
X[2] = ( eifSubblockSize + 1 ) * dY[0]
X[3] = X[1] + X[2]
Y[0] = 0
Y[1] = ( eifSubblockSize + 1 ) * dX[1]
Y[2] = ( eifSubblockSize + 1 ) * ( dY[1] + ( 1 << 9 ) )
Y[3] = Y[1] + Y[2]
The variable Xmax is set equal to maximum of X[i] for i is equal 0..3
The variable Xmin is set equal to minimum of X[i] for i is equal 0..3
The variable Ymax is set equal to maximum of Y[i] for i is equal 0..3
The variable Ymin is set equal to minimum of Y[i] for i is equal 0..3
The variable W is set equal to ( Xmax − Xmin + ( 1 << 9 ) − 1 ) >> 9
The variable H is set equal to ( Ymax − Ymin + ( 1 << 9 ) − 1 ) >> 9
If ( W + 2 ) * ( H + 2 ) is greater than 81, the variable eifCanBeApplied is equal to FALSE
Otherwise,
If dY[1] is less than ( (−1) << 9 ), then the variable eifCanBeApplied is equal to FALSE
Otherwise,
If ( max( 0, dY[1] ) + Abs( dX[1] ) ) * ( 1 + eifSubblockSize ) is greater than ( 1 << 9 ) then the variable eifCanBeApplied is equal to FALSE.

If eifCanBeApplied is equal to FALSE than the variables sizeSbX and sizeSbY are modified as follows:
sizeSbX = max( 8, sizeSbX)
sizeSbY = max( 8, sizeSbY)
...

Example 2

In this example, EIF sub-block size is equal to 8×8, maximum number of fetched lines during processing the first line R is equal to 4, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.
...
The variable eifSubblockSize is set equal to 8.
The variable eifCanBeApplied is derived as follows:
  eifCanBeApplied is set to TRUE
  The arrays X[i], Y[i] are derived as follows:
  X[0] = 0
  X[1] = ( eifSubblockSize + 1 ) * ( dX[0] + ( 1 << 9 ) )
  X[2] = ( eifSubblockSize + 1 ) * dY[0]
  X[3] = X[1] + X[2]
  Y[0] = 0
  Y[1] = ( eifSubblockSize + 1 ) * dX[1]
  Y[2] = ( eifSubblockSize + 1 ) * ( dY[1] + ( 1 << 9 ) )
  Y[3] = Y[1] + Y[2]
  The variable Xmax is set equal to maximum of X[i] for i is equal 0..3
  The variable Xmin is set equal to minimum of X[i] for i is equal 0..3
  The variable Ymax is set equal to maximum of Y[i] for i is equal 0..3
  The variable Ymin is set equal to minimum of Y[i] for i is equal 0..3
  The variable W is set equal to ( Xmax − Xmin + ( 1 << 9 ) − 1 ) >> 9
  The variable H is set equal to ( Ymax − Ymin + ( 1 << 9 ) − 1 ) >> 9
  If ( W + 2 ) * ( H + 2 ) is greater than 225, the variable eifCanBeApplied is equal to FALSE
  Otherwise,
  If dY[1] is less than ( (−1) << 9 ), then the variable eifCanBeApplied is equal to FALSE
  Otherwise,
  If ( max( 0, dY[1] ) + Abs( dX[1] ) ) * ( 1 + eifSubblockSize ) is greater than 2 * ( 1 << 9 ) then the variable eifCanBeApplied is equal to FALSE.
  If eifCanBeApplied is equal to FALSE than the variables sizeSbX and sizeSbY are modified as follows:
  sizeSbX = max( 8, sizeSbX)
  sizeSbY = max( 8, sizeSbY)
...

Example 3

In this example, EIF sub-block size is equal to 8×8, maximum number of fetched lines during processing the first line R is equal to 5, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.
...
The variable eifSubblockSize is set equal to 8.
The variable eifCanBeApplied is derived as follows:
  eifCanBeApplied is set to TRUE
  The arrays X[i], Y[i] are derived as follows:
  X[0] = 0
  X[1] = ( eifSubblockSize + 1 ) * ( dX[0] + ( 1 << 9 ) )
  X[2] = ( eifSubblockSize + 1 ) * dY[0]
  X[3] = X[1] + X[2]
  Y[0] = 0
  Y[1] = ( eifSubblockSize + 1 ) * dX[1]
  Y[2] = ( eifSubblockSize + 1 ) * ( dY[1] + ( 1 << 9 ) )
  Y[3] = Y[1] + Y[2]
  The variable Xmax is set equal to maximum of X[i] for i is equal 0..3
  The variable Xmin is set equal to minimum of X[i] for i is equal 0..3
  The variable Ymax is set equal to maximum of Y[i] for i is equal 0..3
  The variable Ymin is set equal to minimum of Y[i] for i is equal 0..3
  The variable W is set equal to ( Xmax − Xmin + ( 1 << 9 ) − 1 ) >> 9
  The variable H is set equal to ( Ymax − Ymin + ( 1 << 9 ) − 1 ) >> 9
  If ( W + 2 ) * ( H + 2 ) is greater than 225, the variable eifCanBeApplied is equal to FALSE
  Otherwise,
  If dY[1] is less than ( (−1) << 9 ), then the variable eifCanBeApplied is equal to FALSE
  Otherwise,
  If ( max( 0, dY[1] ) + Abs( dX[1] ) ) * ( 1 + eifSubblockSize ) is greater than 3 * ( 1 << 9 ) then the variable eifCanBeApplied is equal to FALSE.
  If eifCanBeApplied is equal to FALSE than the variables sizeSbX and sizeSbY are modified as follows:
  sizeSbX = max( 8, sizeSbX)
  sizeSbY = max( 8, sizeSbY)
...

Example 4

In this example, EIF sub-block size is equal to 8×8, only the memory bandwidth restriction is checked for EIF, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.
...
The variable eifSubblockSize is set equal to 8.
The variable eifCanBeApplied is derived as follows:
  eifCanBeApplied is set to TRUE
  The arrays X[i], Y[i] are derived as follows:
  X[0] = 0
  X[1] = ( eifSubblockSize + 1 ) * ( dX[0] + ( 1 << 9 ) )
  X[2] = ( eifSubblockSize + 1 ) * dY[0]
  X[3] = X[1] + X[2]
  Y[0] = 0
  Y[1] = ( eifSubblockSize + 1 ) * dX[1]
  Y[2] = ( eifSubblockSize + 1 ) * ( dY[1] + ( 1 << 9 ) )
  Y[3] = Y[1] + Y[2]
  The variable Xmax is set equal to maximum of X[i] for i is equal 0..3
  The variable Xmin is set equal to minimum of X[i] for i is equal 0..3
  The variable Ymax is set equal to maximum of Y[i] for i is equal 0..3
  The variable Ymin is set equal to minimum of Y[i] for i is equal 0..3
  The variable W is set equal to ( Xmax − Xmin + ( 1 << 9 ) − 1 ) >> 9
  The variable H is set equal to ( Ymax − Ymin + ( 1 << 9 ) − 1 ) >> 9
  If ( W + 2 ) * ( H + 2 ) is greater than 225, the variable eifCanBeApplied is equal to FALSE
  If eifCanBeApplied is equal to FALSE than the variables sizeSbX and sizeSbY are modified as follows:
  sizeSbX = max( 8, sizeSbX)
  sizeSbY = max( 8, sizeSbY)
...

Example 5

In this example, EIF sub-block size is equal to 4×4, only the memory bandwidth restriction is checked for EIF, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.
...
The variable eifSubblockSize is set equal to 4.
The variable eifCanBeApplied is derived as follows:
  eifCanBeApplied is set to TRUE
  The arrays X[i], Y[i] are derived as follows:
  X[0] = 0
  X[1] = ( eifSubblockSize + 1 ) * ( dX[0] + ( 1 << 9 ) )
  X[2] = ( eifSubblockSize + 1 ) * dY[0]
  X[3] = X[1] + X[2]
  Y[0] = 0
  Y[1] = ( eifSubblockSize + 1 ) * dX[1]
  Y[2] = ( eifSubblockSize + 1 ) * ( dY[1] + ( 1 << 9 ) )
  Y[3] = Y[1] + Y[2]
  The variable Xmax is set equal to maximum of X[i] for i is equal 0..3
  The variable Xmin is set equal to minimum of X[i] for i is equal 0..3
  The variable Ymax is set equal to maximum of Y[i] for i is equal 0..3
  The variable Ymin is set equal to minimum of Y[i] for i is equal 0..3
  The variable W is set equal to ( Xmax − Xmin + ( 1 << 9 ) − 1 ) >> 9
  The variable H is set equal to ( Ymax − Ymin + ( 1 << 9 ) − 1 ) << 9
  If ( W + 2 ) * ( H + 2 ) is greater than 81, the variable eifCanBeApplied
  is equal to FALSE
  If eifCanBeApplied is equal to FALSE than the variables sizeSbX and sizeSbY are modified as follows:
  sizeSbX = max( 8, sizeSbX)
  sizeSbY = max( 8, sizeSbY)
...

Figure 12:
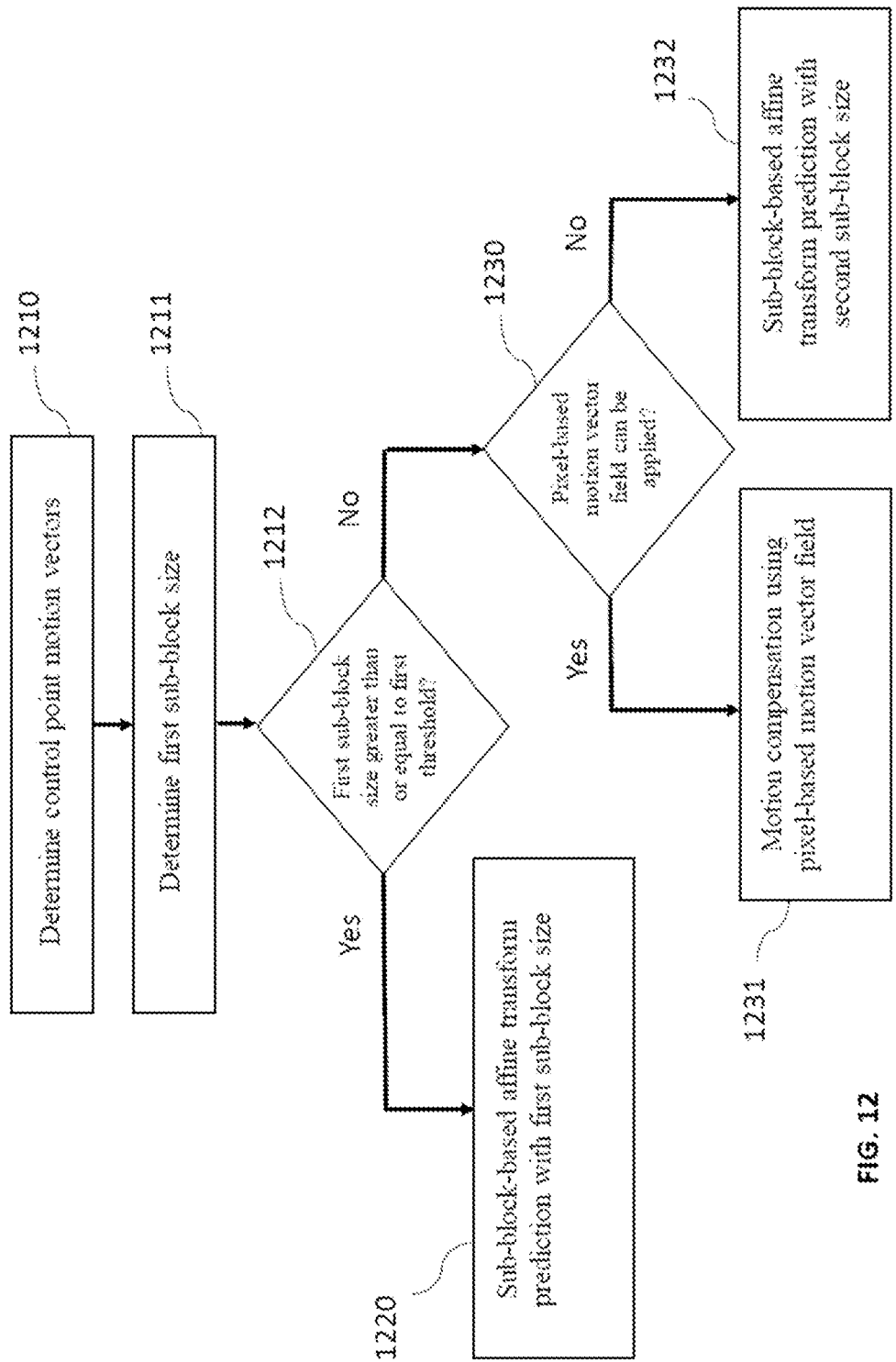
FIG. 12 shows a flowchart for a method for coding a video implemented in an encoder or a decoder according to an embodiment of the disclosure.

According to the present disclosure, a method for coding a video may be implemented in a video encoding device or a video decoding device with the following steps schematically shown in FIG. 12.

Step 1210: CPMVs are determined for an affine block.

Step 1211: A first sub-block size of a sub-block of the affine block is determined.

Step 1212: It is established whether the first sub-block size determined at Step 1211 is greater than or equal to a first sub-block size threshold.

Step 1220: If the output of Step 1212 is "Yes", then sub-block based affine transform prediction is performed on the affine block with the first sub-block size.

Step 1230: If the output of Step 1212 is "No", then it is established whether a pixel-based motion vector field is applied for performing motion compensation for the affine block, according to values of the CPMVs.

Step 1231: If the output of Step 1230 is "Yes", then motion compensation for a sub-block of the affine block using the pixel-based motion vector field is performed.

Step 1232: If the output of Step 1230 is "No", then sub-block based affine transform prediction is performed on the affine block with a second sub-block size, wherein the second sub-block size is based on the first sub-block size.

Figure 13:
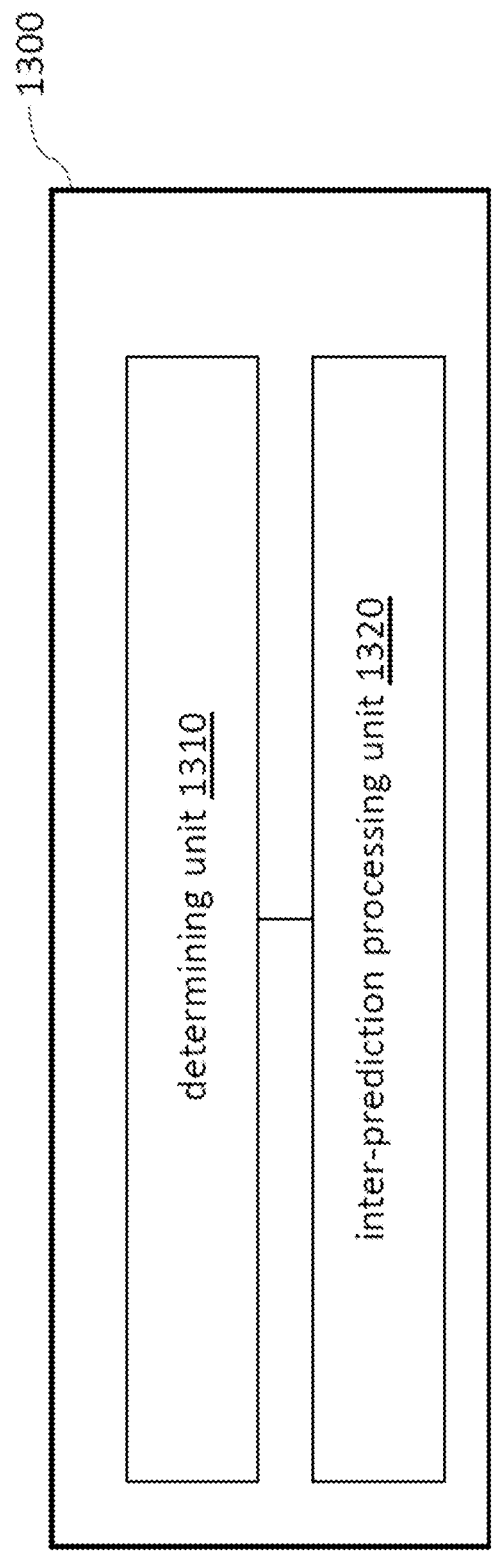
FIG. 13 shows a block diagram illustrating an example of an inter-prediction apparatus according to an embodiment of the disclosure.

FIG. 13 shows a block diagram illustrating an example of an inter-prediction apparatus according to embodiments of the disclosure. In particular, FIG. 13 shows an inter-prediction apparatus (module) 1300. In an example, the inter-prediction apparatus 1300 may be implemented, for example as 244 in FIG. 2, or 344 in FIG. 3. The inter-prediction apparatus 1300 includes a determining unit (module) 1310 and an inter-prediction processing unit 1320.

The determining unit 1310 is configured to determine CPMVs for an affine block and a first sub-block size of a sub-block of the affine block. The inter-prediction processing unit 1320 is configured to perform sub-block-based affine transform prediction on the affine block with the first sub-block size if the first sub-block size is greater than or equal to a first sub-block size threshold, and if the first sub-block size is less than the first sub-block size threshold, to determine whether a pixel-based motion vector field is not applied for performing motion compensation for the affine block, according to values of the CPMVs, and, upon determination that the pixel-based motion vector field is not applied, to perform sub-block-based affine transform prediction on the affine block with a second sub-block size, wherein the second sub-block size is based on the first sub-block size, and, upon determination that the pixel-based motion vector field is applied, to perform motion compensation for a sub-block of the affine block using the pixel-based motion vector field.

The method according to embodiments of the disclosure can be performed by the apparatus according to the embodiment of the disclosure. Further features and implementation forms of the method according to the embodiments of the disclosure correspond to the features and implementation forms of the apparatus according to the embodiment of the disclosure.

The advantages of the methods according to embodiments are the same as those for the corresponding implementation forms of the apparatus according to the embodiment.

The determining unit 1310 and the inter-prediction processing unit 1320 may be implemented in hardware, software, firmware, or any combination thereof. If implemented in software, the functions may be stored on a computer-readable medium or transmitted over communication media as one or more instructions or code and executed by a hardware-based processing unit. Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Some particular embodiments are outlined in the following aspects of the disclosure.

According to a first aspect, a method implemented in an encoder is provided, the method comprising determining, control points for an affine block according to affine inter-prediction, determining a sub-block size of the sub-block, determining a motion vector for a sub-block of the affine block based on the control points, selecting, an interpolation filter for application to a reference block corresponding to the sub-block, applying, the interpolation filter to the reference block to determine a reference sample at the fractional position, determining, residual information for the sub-block based on a difference between the current sample of the sub-block and the reference sample at the reference block, encoding, the residual information in a bitstream.

According to a second aspect, a method implemented in a decoder is provided, the method comprising determining, a sub-block size of the sub-block, determining a motion vector for a sub-block of the affine block based on the control points, selecting, an interpolation filter for application to a reference block corresponding to the sub-block, determining that a motion vector for a current sample points to a fractional position at the reference block, the motion vector for the current sample offset from the motion vector for the sub-block, applying, the interpolation filter to the reference block to determine a reference sample at the fractional position, determining, prediction information based on the reference sample, reconstructing, the affine block based on the prediction information and based on residual information for the affine block included in a bitstream.

According to a third aspect, an encoder comprising processing circuitry for carrying out the method according to any one of the first or second aspect is provided.

According to a fourth aspect, a decoder comprising processing circuitry for carrying out the method according to any one of the first or second aspect is provided.

According to a fifth aspect, a computer program product comprising program code for performing the method according to any one of the first or second aspect when executed on a computer or a processor is provided.

According to a sixth aspect, a decoder is provided, comprising one or more processors, and a non-transitory computer-readable storage medium coupled to the processors and storing programming for execution by the processors, wherein the programming, when executed by the processors, configures the decoder to carry out the method according to any one of the first or second aspect.

According to a seventh aspect, an encoder is provided, comprising one or more processors, and a non-transitory computer-readable storage medium coupled to the processors and storing programming for execution by the processors, wherein the programming, when executed by the processors, configures the encoder to carry out the method according to any one of the first or second aspect.

According to an eighth aspect, a non-transitory computer-readable medium carrying a program code which, when executed by a computer device, causes the computer device to perform the method of any one of the first or second aspect is provided.

Following is an explanation of the applications of the encoding method as well as the decoding method as shown in the above-mentioned embodiments, and a system using them.

Figure 10:
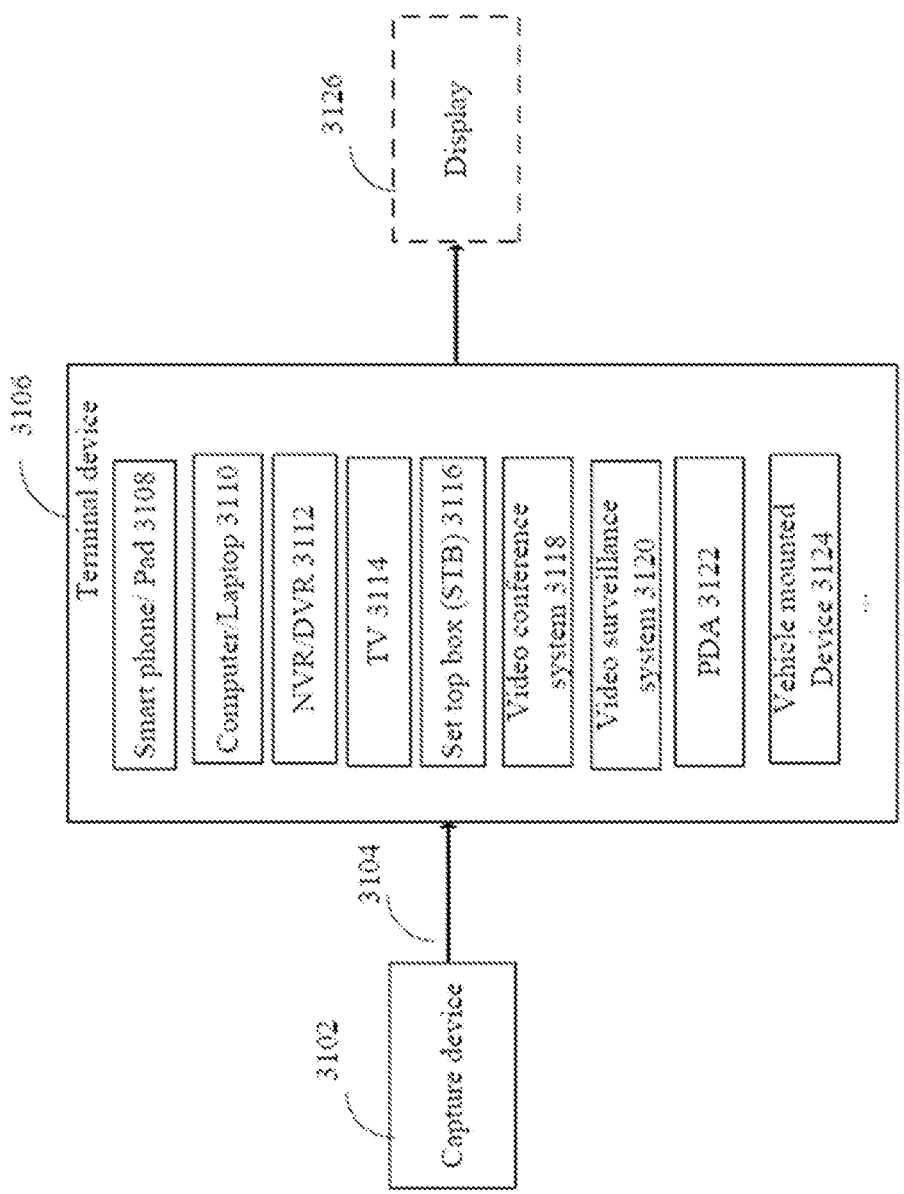
FIG. 10 is a block diagram showing an example structure of a content supply system which realizes a content delivery service.

FIG. 10 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WI-FI, Ethernet, cable, wireless (third generation (3G)/fourth generation (4G)/fifth generation (5G)), Universal Serial Bus (USB), or any kind of combination thereof, or the like.

The capture device 3102 generates data, and may encode the data by the encoding method as shown in the above embodiments. Alternatively, the capture device 3102 may distribute the data to a streaming server (not shown in the figures), and the server encodes the data and transmits the encoded data to the terminal device 3106. The capture device 3102 includes but not limited to camera, smart phone or IPAD, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 11:
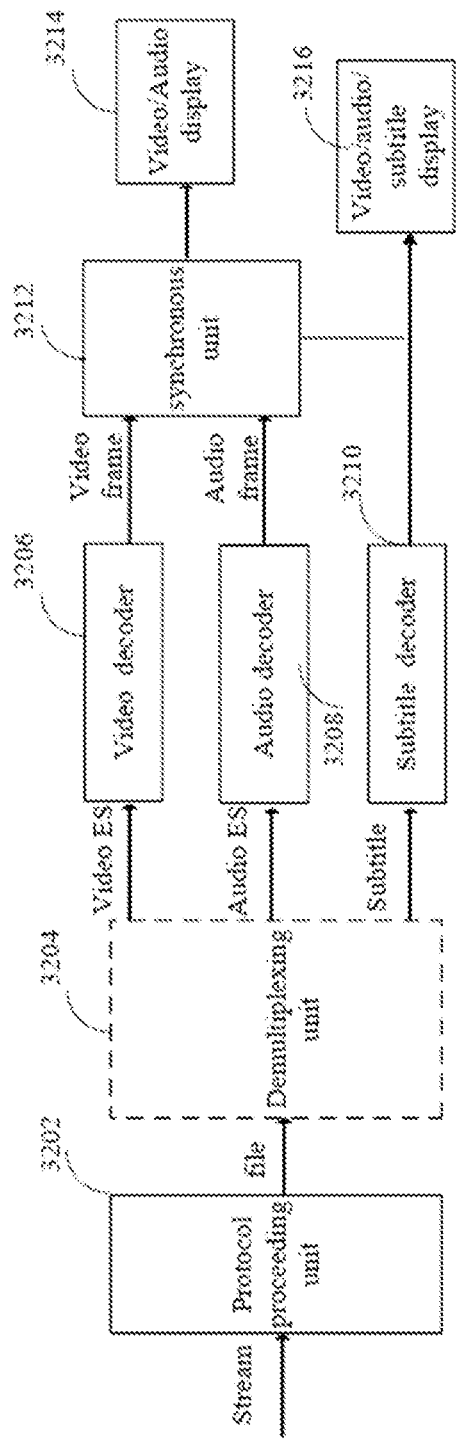
FIG. 11 is a block diagram showing a structure of an example of a terminal device.

FIG. 11 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live Streaming Protocol (HLS), MPEG-Dynamic Adaptive Streaming over HTTP (DASH), Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators:

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

$$\sum_{i=x}^{y} f(i)$$

The summation of f(i) with i taking all integer values from x up to and including y. Modulus. Remainder of x divided by y, defined only for integers x and y with x>=0
x % y and y>0.

Logical Operators:

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
=Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−=Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$Abs(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π≥2 to π÷2, inclusive, in units of radians A tan(x) the trigonometric inverse tangent function, operating on an argument x, with an output value in the range of $-\pi \div 2$ to $\pi \div 2$, inclusive, in units of radians $$A\tan2(y, x) = \begin{cases} A\tan\left(\frac{y}{x}\right); & x > 0 \\ A\tan\left(\frac{y}{x}\right) + \pi; & x < 0 \text{ \&\& } y >= 0 \\ A\tan\left(\frac{y}{x}\right) - \pi; & x < 0 \text{ \&\& } y < 0 \\ +\frac{\pi}{2}; & x == 0 \text{ \&\& } y >= 0 \\ -\frac{\pi}{2}; & \text{otherwise} \end{cases}$$

Ceil(x) the smallest integer greater than or equal to x.

$Clip1_Y(x) = Clip3(0, (1 << BitDepth_Y) - 1, x)$ $Clip1_C(x) = Clip3(0, (1 << BitDepth_C) - 1, x)$ $$Clip3(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to X.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.
Log 10(x) the base-10 logarithm of X.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x) = Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians Sqrt(x) = $\sqrt{x}$ Swap(x, y) = (y, x)

Tan(x) the trigonometric tangent function operating on an argument x in units of radians Order of Operation Precedence:
When an order of precedence in an expression is not indicated explicitly by use of parentheses, the following rules apply:
Operations of a higher precedence are evaluated before any operation of a lower precedence.

Operations of the same precedence are evaluated sequentially from left to right.

The table below specifies the precedence of operations from highest to lowest, a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)
"x++", "x− −"
"!x", "−x" (as a unary prefix operator)
$x^y$
"x * y", "x / y", "x ÷ y", "x/y", "x % y"
"x + y", "x − y" (as a two-argument operator), "
"$\sum_{i=x}^{y} f(i)$"
"x << y", x >> y"
"x < y", "x <= y", "x > y", "x >= y"
"x == y", "x != y"
"x & y"
"x | y"
"x && y"
"x || y"
"x ? y : z"
"x..y"
"x = y", "x += y", "x −= y"

Text Description of Logical Operations
In the text, a statement of logical operations as would be described mathematically in the following form:

```
if( condition 0 )
    statement 0
else if( condition 1 )
    statement 1
...
else /* informative remark on remaining condition */
    statement n
may be described in the following manner:
... as follows / ... the following applies:
    -  If condition 0, statement 0
    -  Otherwise, if condition 1, statement 1
    -  ...
    -  Otherwise (informative remark on remaining condition),
       statement n
```

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a || condition 1b )
    statement 1
...
else
    statement n
may be described in the following manner:
```

-continued

```
... as follows / ... the following applies:
    If all of the following conditions are true, statement 0:
    condition 0a
    condition 0b
    Otherwise, if one or more of the following conditions are true,
    statement 1:
    condition 1a
    condition 1b
    ...
    Otherwise, statement n
```

In the text, a statement of logical operations as would be described mathematically in the following form:

```
    if( condition 0 )
    statement 0
    if( condition 1 )
    statement 1
    may be described in the following manner:
        When condition 0, statement 0
        When condition 1, statement 1.
```

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (or tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact-disc (CD) ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes CD, laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method, comprising:
    performing a first sub-block-based affine transform prediction on an affine block when a first sub-block size of a sub-block of the affine block is greater than or equal to a first sub-block size threshold;
    detecting, according to values of control point motion vectors (CPMVs) for the affine block, whether a pixel-based motion vector field is not applied for performing motion compensation for the affine block when the first sub-block size is less than the first sub-block size threshold;
    when detecting that the pixel-based motion vector field is not applied, performing a second sub-block-based affine transform prediction on the affine block with a second sub-block size and not performing the motion compensation for the affine block using the pixel-based motion vector field, wherein the second sub-block size is based on the first sub-block size; and when detecting that the pixel-based motion vector field is applied, performing the motion compensation for the affine block using the pixel-based motion vector field.

2. The method of claim 1, further comprising setting the second sub-block size as a second sub-block size threshold when the first sub-block size is smaller than the second sub-block size threshold.

3. The method of claim 2, wherein the second sub-block size threshold is a square sub-block size threshold of N×N.

4. The method of claim 3, wherein the second sub-block size threshold is 8×8.

5. The method of claim 2, further comprising calculating the second sub-block size using the following formulas:

$$sizeSbX'=\text{Max}(8,sizeSbX); \text{ and}$$

$$sizeSbY'=\text{Max}(8,sizeSbY),$$

wherein the second sub-block size threshold is 8, wherein sizeSbX and sizeSbY indicate the first sub-block size, and wherein sizeSbX' and sizeSbY' indicate the second sub-block size.

6. The method of claim 2, wherein the second sub-block size threshold is the same as the first sub-block size threshold.

7. The method of claim 1, further comprising:
deriving the pixel-based motion vector field for the affine block;
obtaining, based on the pixel-based motion vector field, interpolated samples in a reference picture; and
applying a high-pass filter to the interpolated samples.

8. The method of claim 1, further comprising detecting, according to motion vector differences between affine control points, whether the pixel-based motion vector field is not applied for performing the motion compensation for the affine block when the first sub-block size is less than the first sub-block size threshold.

9. The method of claim 1, further comprising:
obtaining, using bilinear interpolation, interpolated samples in a reference picture; and
applying a high-pass filter to the interpolated samples when the pixel-based motion vector field is applied.

10. A decoder comprising:
one or more processors; and
a non-transitory computer-readable storage medium coupled to the one or more processors and configured to store instructions, wherein when executed by the one or more processors, the instructions cause the decoder to:
perform a first sub-block-based affine transform prediction on an affine block when a first sub-block size is greater than or equal to a first sub-block size threshold;
detect, according to values of control point motion vectors (CPMVs) for the affine block whether a pixel-based motion vector field is not applied for performing motion compensation for the affine block when the first sub-block size is less than the first sub-block size threshold;
when detecting that the pixel-based motion vector field is not applied, perform a second sub-block-based affine transform prediction on the affine block with a second sub-block size and not perform the motion compensation for the affine block using the pixel-based motion vector field, wherein the second sub-block size is based on the first sub-block size; and
when detecting that the pixel-based motion vector field is applied, perform the motion compensation for the affine block using the pixel-based motion vector field.

11. The decoder of claim 10, wherein when executed by the one or more processors, the instructions further cause the decoder to set the second sub-block size as a second sub-block size threshold when the first sub-block size is smaller than the second sub-block size threshold.

12. The decoder of claim 11, wherein the second sub-block size threshold is a square sub-block size threshold of N×N.

13. The decoder of claim 12, wherein the second sub-block size threshold is 8×8.

14. The decoder of claim 11, wherein when executed by the one or more processors, the instructions further cause the decoder to calculate the second sub-block size using the following formulas:

$$sizeSbX'=\text{Max}(8,sizeSbX); \text{ and}$$

$$sizeSbY'=\text{Max}(8,sizeSbY),$$

wherein the second sub-block size threshold is 8, wherein sizeSbX and sizeSbY indicate the first sub-block size, and wherein sizeSbX' and sizeSbY' indicate the second sub-block size.

15. The decoder of claim 11, wherein the second sub-block size threshold is the same as the first sub-block size threshold.

16. The decoder of claim 10, wherein when executed by the one or more processors, the instructions further cause the decoder to:
derive the pixel-based motion vector field for the affine block;
obtain, based on the pixel-based motion vector field, interpolated samples in a reference picture; and
apply a high-pass filter to the interpolated samples.

17. A computer program product comprising computer-executable instructions that are stored on a non-transitory computer-readable medium and that, when executed by one or more processors, cause a computer device to:
perform a first sub-block-based affine transform prediction on an affine block when a first sub-block size is greater than or equal to a first sub-block size threshold;
detect, according to values of control point motion vectors (CPMVs) for the affine block, whether a pixel-based motion vector field is not applied for performing motion compensation for the affine block when the first sub-block size is less than the first sub-block size threshold;
when detecting that the pixel-based motion vector field is not applied, perform a second sub-block-based affine transform prediction on the affine block with a second sub-block size and not perform the motion compensation for the affine block using the pixel-based motion vector field, wherein the second sub-block size is based on the first sub-block size; and
when detecting that the pixel-based motion vector field is applied, perform the motion compensation for the affine block using the pixel-based motion vector field.

18. The computer program product of claim 17, wherein the computer-executable instructions further cause the computer device to set the second sub-block size as a second sub-block size threshold when the first sub-block size is smaller than the second sub-block size threshold.

19. The computer program product of claim 18, wherein the second sub-block size threshold is a square sub-block size threshold of N×N.

20. The computer program product of claim 19, wherein the second sub-block size threshold is 8×8.

21. The computer program product of claim 18, wherein the computer-executable instructions further cause the computer device to calculate the second sub-block size using the following formulas:

$$sizeSbX'=Max(8, sizeSbX); \text{ and}$$

$$sizeSbY'=Max(8, sizeSbY),$$

wherein the second sub-block size threshold is 8, wherein sizeSbX and sizeSbY indicate the first sub-block size, and wherein sizeSbX' and sizeSbY' indicate the second sub-block size.

22. The computer program product of claim 18, wherein the second sub-block size threshold is the same as the first sub-block size threshold.

* * * * *